US 12,436,665 B2

(12) United States Patent
Howell et al.

(10) Patent No.: US 12,436,665 B2
(45) Date of Patent: Oct. 7, 2025

(54) DIGITAL STORY GENERATION

(71) Applicant: StoryForge LLC, St. Paul, MN (US)

(72) Inventors: Eric Dennis Howell, St. Paul, MN (US); Wiliam Daniel Schultz, Plymouth, MN (US)

(73) Assignee: StoryForge LLC, St. Paul, MN (US)

( * ) Notice: Subject to any disclaimer, the term of this patent is extended or adjusted under 35 U.S.C. 154(b) by 0 days.

(21) Appl. No.: 17/817,392

(22) Filed: Aug. 4, 2022

(65) Prior Publication Data

US 2023/0038412 A1     Feb. 9, 2023

Related U.S. Application Data

(60) Provisional application No. 63/203,916, filed on Aug. 4, 2021.

(51) Int. Cl.
*G06F 3/0483*     (2013.01)
*G06F 3/0482*     (2013.01)
*H04N 21/80*      (2011.01)

(52) U.S. Cl.
CPC .......... *G06F 3/0483* (2013.01); *G06F 3/0482* (2013.01); *H04N 21/80* (2013.01)

(58) Field of Classification Search
CPC ...... G06F 3/0483; G06F 3/0482; H04N 21/80
See application file for complete search history.

(56) References Cited

U.S. PATENT DOCUMENTS

| | | | |
|---|---|---|---|
| 6,232,966 B1 | 5/2001 | Kurlander | |
| 8,327,253 B2 | 12/2012 | Han et al. | |
| 8,422,852 B2 | 4/2013 | Suri et al. | |
| 10,929,595 B2 | 2/2021 | Howell | |
| 11,026,064 B1* | 6/2021 | Paul | H04W 4/21 |
| 2003/0018663 A1 | 1/2003 | Cornette et al. | |
| 2005/0055624 A1 | 3/2005 | Seeman et al. | |
| 2007/0256011 A1 | 11/2007 | Jones | |
| 2009/0172161 A1* | 7/2009 | Singh | G06F 16/958 709/225 |
| 2010/0110081 A1 | 5/2010 | Arora et al. | |
| 2010/0257457 A1* | 10/2010 | De Goes | H04L 65/1093 707/E17.007 |
| 2010/0325558 A1* | 12/2010 | Edwards | G06Q 10/10 715/751 |
| 2011/0246891 A1 | 10/2011 | Schubert et al. | |
| 2012/0210200 A1 | 8/2012 | Berger et al. | |
| 2013/0013991 A1 | 1/2013 | Evans | |
| 2013/0103389 A1* | 4/2013 | Gattani | G06F 40/295 704/9 |

(Continued)

FOREIGN PATENT DOCUMENTS

WO     2017/218043 A1     12/2017

OTHER PUBLICATIONS

Spear, Rebecca, "Best Comic Book Software of 2018," https://web.archive.org/web/20171223201031/https://www.toptenreviews.com/software/entertainment/best-comic-book-software/, Dec. 18, 2017, 21 pages.

*Primary Examiner* — Reji Kartholy
(74) *Attorney, Agent, or Firm* — Merchant & Gould P.C.

(57) ABSTRACT

A digital story includes textual, visual, and/or audio aspects. Generation of a new digital story and/or editing of an existing digital story can include, for instance, coordinating presentation of textual, visual, and/or audio aspects of the digital story. A digital story can be viewed and/or accessed by a user remote from one or more authors of the digital story.

10 Claims, 19 Drawing Sheets

(56) References Cited

U.S. PATENT DOCUMENTS

| | | |
|---|---|---|
| 2013/0145240 A1 | 6/2013 | Anderson et al. |
| 2013/0151970 A1* | 6/2013 | Achour ............... G06Q 10/101 |
| | | 715/723 |
| 2014/0040712 A1* | 2/2014 | Chang ............... G06Q 30/0241 |
| | | 715/252 |
| 2014/0282013 A1 | 9/2014 | Aimijee |
| 2014/0289645 A1* | 9/2014 | Megiddo ................ G06F 3/048 |
| | | 715/753 |
| 2014/0310746 A1 | 10/2014 | Larsen et al. |
| 2014/0337792 A1 | 11/2014 | Phang et al. |
| 2014/0351679 A1 | 11/2014 | Tobita |
| 2015/0082195 A1 | 3/2015 | Berger et al. |
| 2015/0143209 A1 | 5/2015 | Sudai |
| 2016/0125632 A1 | 5/2016 | Yu et al. |
| 2016/0217699 A1 | 7/2016 | Thankavel |
| 2016/0275067 A1 | 9/2016 | Mei et al. |
| 2017/0235738 A1 | 8/2017 | Spaulding |
| 2017/0242833 A1 | 8/2017 | Rakshit et al. |
| 2019/0173690 A1 | 6/2019 | McCue et al. |
| 2019/0205372 A1* | 7/2019 | Li ......................... G06F 40/232 |
| 2019/0347313 A1* | 11/2019 | Walsh ................... G06F 3/0482 |
| 2019/0347318 A1* | 11/2019 | Howell ................ G06V 40/166 |
| 2020/0034385 A1* | 1/2020 | Blum .................... G06F 16/635 |
| 2020/0304447 A1* | 9/2020 | Nourbakhsh ........... H04W 4/21 |
| 2021/0286937 A1 | 9/2021 | Howell |
| 2021/0358525 A1* | 11/2021 | Chang .................... G06V 20/44 |
| 2021/0377052 A1* | 12/2021 | Brown ..................... H04L 9/50 |
| 2022/0301593 A1* | 9/2022 | Huang ................... H04N 23/90 |

* cited by examiner

1300

| | |
|---|---|
| User digitizes content | 1301 |
| Content stored | 1302 |
| User selects levels of collaboration settings | 1303 |
| Levels fo collaborations settings stored | 1304 |
| User makes content available for collaboration | 1305 |
| Collaborators contribute to content | 1306 |
| Collaborator content is stored | 1307 |
| User selects collaborator content for inclusion | 1308 |
| User opts to re-publish for additional collaboration | 1309 |
| Collaborative content re-published for additional collaboration | 1310 |
| Collaborators contribute to content | 1311 |
| User selects collaborator content for inclusion | 1312 |
| User saves content with collaborator contributions | 1313 |
| User mixes content with collaborator contributions | 1314 |
| Content with collaborator contributions made available | 1315 |
| Content with collaborator contributions is published for viewing | 1316 |
| Content with collaborator contributions shared | 1317 |
| Monetization for collaborative content | 1318 |
| New editions are saved | 1319 |

| | |
|---|---|
| User digitizes content | 1301 |
| Content stored | 1302 |
| User selects levels of collaboration settings | 1303 |
| Levels fo collaborations settings stored | 1304 |
| User makes content available for collaboration | 1305 |
| Collaborators contribute to content | 1306 |
| Collaborator content is stored | 1307 |
| User selects collaborator content for inclusion | 1308 |
| User opts to re-publish for additional collaboration | 1309 |
| Collaborative content re-published for additional collaboration | 1310 |
| Collaborators contribute to content | 1311 |
| User selects collaborator content for inclusion | 1312 |
| User saves content with collaborator contributions | 1313 |
| User mixes content with collaborator contributions | 1314 |
| Content with collaborator contributions made available | 1315 |
| Content with collaborator contributions is published for viewing | 1316 |
| Content with collaborator contributions shared | 1317 |
| Monetization for collaborative content | 1318 |
| New editions are saved | 1319 |
| Uploading content to the blockchain | 1320 |
| Executing smart contract protocols | 1321 |
| Schedule royalties | 1322 |
| Associating a digital wallet | 1323 |
| NFT content on the blockchain is available in a marketplace | 1324 |
| Making content available for sale | 1325 |
| Selecting collaboration levels | 1326 |
| Collaborators contribute to content | 1327 |
| Minting collaborative content | 1328 |
| Monetizing collaborative content | 1329 |
| Associating collaborative content with a metaverse | 1330 |

| Position | Term | Position | Term | Position | Term | Position | Term |
|---|---|---|---|---|---|---|---|
| 1 | Panda | 21 | excursions | 41 | all | 61 | the |
| 2 | loved | 22 | This | 42 | began | 62 | New |
| 3 | pizza | 23 | was | 43 | within | 63 | York |
| 4 | and | 24 | the | 44 | announcement | 64 | Central |
| 5 | frequented | 25 | day | 45 | over | 65 | Zoo. |
| 6 | Abe's | 26 | Panda's | 46 | the | 66 | All |
| 7 | Pizzeria | 27 | shoes | 47 | pizzeria | 67 | the |
| 8 | in | 28 | would | 48 | loudspeaker | 68 | animals |
| 9 | lower | 29 | fly | 49 | and | 69 | were |
| 10 | Queens. | 30 | off | 50 | the | 70 | on, |
| 11 | This | 31 | in | 51 | race | 71 | the |
| 12 | October | 32 | and | 52 | was | 72 | move |
| 13 | sunny | 33 | all-out | 53 | on. | | |
| 14 | day, | 34 | sprint | 54 | Monkey | | |
| 15 | however, | 35 | with | 55 | had | | |
| 16 | was | 36 | Excited | 56 | hidden | | |
| 17 | not | 37 | Juice | 57 | the | | |
| 18 | like | 38 | in | 58 | golden | | |
| 19 | other | 39 | hand. | 59 | gem | | |
| 20 | pizza | 40 | It | 60 | at | | |

DIGITAL STORY GENERATION

RELATED APPLICATIONS

This patent application is related to U.S. patent application Ser. No. 16/407,908 filed on May 9, 2019, the entirety of which is hereby incorporated by reference.

INTRODUCTION

Storytelling can be a way to communicate history, to entertain, to educate, and to bond with other people. Over time, people have communicated storytelling in various mediums. Books are a common medium for storytelling. Graphic novels are another medium used for storytelling.

SUMMARY

Embodiments of the disclosure are directed to digital stories. Generally, systems and methods disclosed herein generate and/or edit a digital story. Presentation of a digital story can include coordination of various aspects, such as visual, audio, and textual components of the digital story.

In one aspect, a digital story editing system is disclosed. The example digital story editing system includes at least one processor and memory. The memory encodes computer executable instructions that, when executed by at least one processor, cause the digital story editing system to: receive a digital story, where the digital story includes a plurality of content pages; provide a sound effect module programmed to receive a digital sound effect file; provide a soundtrack module programmed to receive a digital music file; provide a timeline module programmed to provide controls for playback of the digital sound effect file and/or the digital music file; provide a face replacement module programmed to receive a digital image file and selectably replace a character face with at least a portion of the digital image file; provide a page order management module programmed to arrange the plurality of content pages in a given order; provide a sharing module programmed to enable collaboration and viewing between remote parties; and provide a pacing module programmed to control an amount of time each of the plurality of content pages are displayed during a presentation of the digital story.

The details of one or more embodiments are set forth in the accompanying drawings and the description below. Other features, objects, and advantages of these embodiments will be apparent from the description, drawings, and claims.

DESCRIPTION OF THE FIGURES

The following drawing figures, which form a part of this application, are illustrative of described technology and are not meant to limit the scope of the disclosure in any manner.

FIG. 13 shows an example method for generating a digital story.

FIG. 13A shows another example method for generating a digital story.

FIG. 14 shows example geo-location module.

FIG. 15 shows an example of a database field set that provides a unique identification number for each item of content in a digital story.

DETAILED DESCRIPTION

Figure 1:
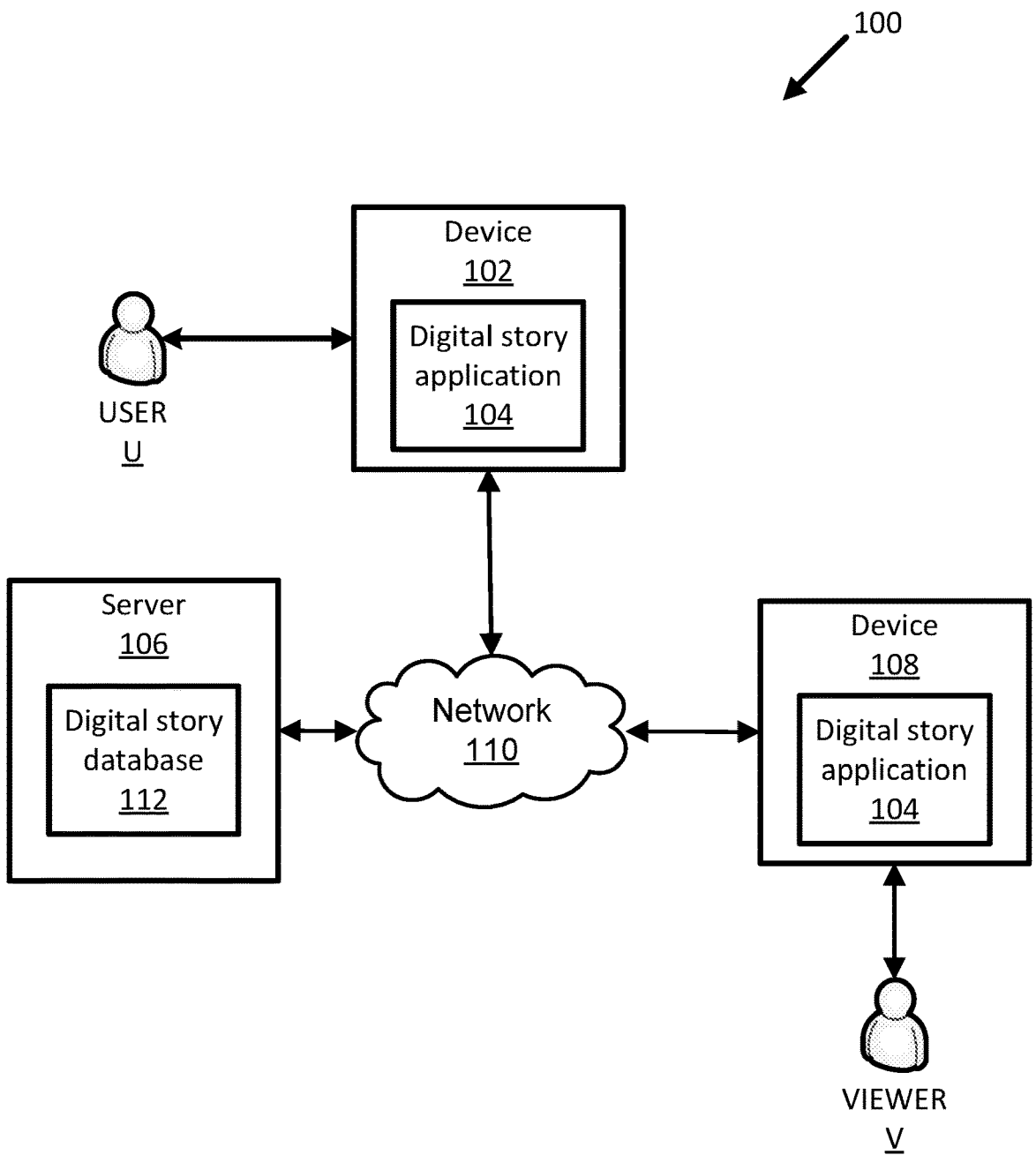
FIG. 1 illustrates an example digital story environment.

Various embodiments of the present disclosure will be described in detail with reference to the drawings, wherein like reference numerals represent like parts and assemblies throughout the several views.

Broadly, the present disclosure is directed to digital stories. Systems and methods of this disclosure are directed towards collaborative content creation, including digital story generation and/or digital story editing, including collaborative content creation.

In an exemplary implementation, a user accesses initial content, such as a digital story, using a computing device hosting a digital story application. The initial content includes one or more pieces of content, where each piece includes one or more of textual, visual, and/or audio aspects. Examples of these aspects include, without limitation, text, drawings, graphs, graphics, images, artwork, charts, photographs, animations, videos, streaming video, audio, streaming music, musical tracks, musical scales, dialogue, and sound effects. The digital story application can enable a user to advance one piece of content at a time (e.g., page by page) or the digital story application can coordinate presentation of each piece of content (e.g., page) in the initial content. Digital story presentation in a viewer can include coordination of presentation of the textual, visual, audio and/or other aspects of each piece of content. Resulting digital stories can be shared and accessed by viewers different (e.g., remote) from the user (or users) who generated the digital story. The remote users can take in the content using a digital story application or viewer and view, add to, or modify the content in a collaborative format. These and other aspects are described in greater detail below.

FIG. 1 shows example digital story environment 100. Example digital story environment 100 includes device 102, server 106, and device 108. User U interacts with digital story application 104 accessible via device 102. Viewer V accesses digital story application 104 via device 108. Server 106, including digital story database 112, is in communication with device 102 and device 108 via network 110. Other embodiments can include more or fewer components. The digital story application 104 can operate as a collaborative tool. The use of digital stories herein is merely exemplary of the type of application that can be used.

Example digital story environment 100 enables content editing and generation by user U, which is in turn viewed by viewer V. Viewer V can collaborate with User U by using the digital story application 104. Broadly, content generated and/or edited in example system 100 includes various types of written and/or pictorial communication. For instance, content can include literature that can be expressed in visual form. In various embodiments, content edited and generated by digital story environment 100 includes, for example and without limitation, graphic novels, books such as children's books and young adult books, comic books, plays theater, video content, musical scores, musical content, medical content, and greeting cards. For discussion purposes only, content edited and/or generated by digital story environment 100 will be referred to herein as "a digital story" or "digital stories." The use of "a digital story" or "digital stories" is not limited to a particular medium, but rather encompasses various forms of content, including music composition and performance, video and film generation, theater, medicine, and education curriculum and teaching.

User U generates and/or modifies a digital story using digital story application 104. User U is a person who generates original content and/or edits previously created content. As examples, user U can be an original author, a fan of the subject and/or author, a celebrity, a parent, a sibling, etc.

Viewer V views the digital story generated by user U via digital story application 104. Viewer V may or may not be familiar with user U. For instance, viewer V may be a fan of user U. As another example viewer V can be a family member of user U. As another example, viewer V may be a student viewing digital content created by user U as part of coursework and/or classroom activities or may be a patient of a doctor. Viewer V may act as User U and generate and/or modify the digital story. There may be multiple user U and viewer V associated with the system.

Digital story application 104 enables digital story content generation and editing. Digital story application 104 also enables sharing of digital stories generated/edited by digital story application 104. Digital story application 104 can be stored and accessed in various ways. For instance, digital story application 104 can be stored in memory devices of device 102 and device 108 or stored on server 106 and accessed remotely. Additional functionalities and components of digital story application 104 are discussed below with reference to FIG. 2.

Typically, digital story application 104 accesses a digital story by communicating with server 106 over network 110, where server 106 is in communication with digital story database 112. In some implementations, digital story application 104 interfaces with another application such that digital story generation, editing, and/or viewing occurs within that other application. For example, digital story application 104 is a plug-in or add-in for another application. In other instances, digital story application 104 is a stand-alone application or executable application file. The digital story application 104 can be stored at a third-party service such as the Apple App Store or Google Store and downloaded onto device 102.

Device 102 and device 108 include some or all of the computing components shown in, and described with reference to, FIG. 8. For example, device 102 and/or device 108 can be: a general computing device, a tablet computing device, a smartphone, a wearable computing device (such as an augmented reality device or watch), a mobile computing device, or other similar device.

Server 106 communicates with, and provides various functionalities of, digital story application 104. In some instances, server 106 hosts digital story database 112. Digital story database 112 includes one or more data stores for digital stories generated by user U (as well as any other users, including collaborative content generation). In turn, device 108 can access the digital story generated by user U by communicating with server 106 and/or digital story database 112. Device 108 can be used by user V to view content generated by user U and user V can use the digital story application 104 on device 108 to create or modify content stored on digital story database 112.

As mentioned, device 102 and device 108 communicate with the server 106 over network 110. Network 110 is a data communication network that facilitates data communication between two or more of device 102, server 106, and device 108. Network 110 may be any type of wired or wireless network, for example, the Internet, cellular, an intranet, a wide area network (WAN), a local area network (LAN), a metropolitan area network (MAN), a campus area network (CAN), Bluetooth, Bluetooth Low Energy (BLE), enterprise private network (EPN), worldwide interoperability for microwave access (WiMax), and a virtual private network (VPN).

Figure 2:
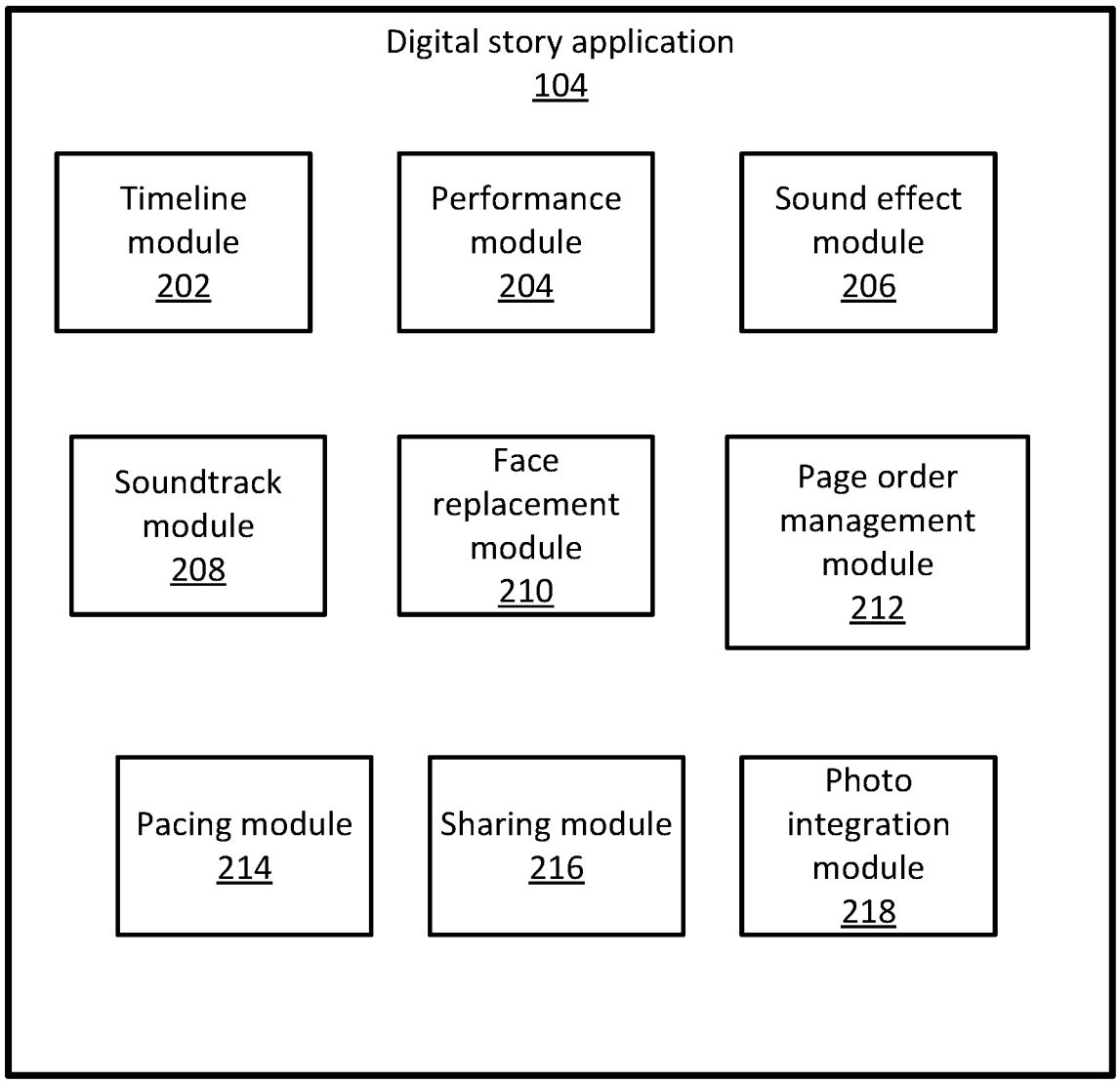
FIG. 2 is a schematic view of example modules included in an example digital story application used in the environment of FIG. 1.

FIG. 2 is a schematic depiction of example modules included in digital story application 104. The example modules provide various functionalities of digital story application 104, including creating and/or editing digital stories. Other implementations can include more or fewer components.

Timeline module 202 enables coordination of various creation and playback aspects during display of content associated with a page or pages of a digital story. In some instances, timeline module 202 causes display on a display screen of one or more timelines as it relates to a given page. That is, a page having visuals and/or text can have a timeline component as well, where that timeline component shows one or more timing sequences.

For example, timeline module 202 can track, coordinate, and/or display timing sequencing of visuals, sound effects, voice and/or dialogue, soundtrack audio, performance components, and other functionalities contemplated herein. In some embodiments, timeline module 202 can show timelines in absolute scale; that is, starting at zero seconds and extending until the user has decided to stop playback or presentation of the particular page. In some embodiments, timeline module 202 shows relative timing of the various sound components to be presented with the page (e.g. sound effects, soundtrack, voice, etc.). The timeline module 202 can be used as part of the digital story application 104 to input content into an appropriately timed portion of the modified digital story. The user U of FIG. 1 can use the timeline module to add content at specified times.

Performance module 204 can receive and present various types of audio and/or visual performances. For example, performance module 204 can receive and record a user reading text (the text typically being displayed on the page), as well as comments made by a user about the page. It will be understood that a user can include one or more different people, for example, a group of people performing different characters in a story. The reading of the text associated with a digital story is one example of the type of content that can be received via the performance module 204. Other examples will include audio and/or visual input related to collaborative music creation where performance module 204 can receive and record musical notes input by a musical input device such as an electric piano or computer with modulator. Other examples of audio and/or visual performances that can be input via the performance module 204 can include a medical doctor dictating details related to a patient, a coach providing comments related to the play of an athlete, a parent reading a greeting card to a child. The audio and/or visual aspects of these examples provide mere examples of the audio and/or visual aspects that can be uploaded using the performance module 204.

In some embodiments, performance module 204 enables collaboration and/or broadcasting of real time recordings of visual or audio material. In some instances, performance module 204 enables a user to capture, import, and/or utilize motion and performance capture, which can be displayed within the digital story. Presentation of various aspects captured and managed by performance module 204 can by synchronized with other aspects, such as voice, sound, and music. By way of example, a symphony at one school can collaborate with a choir at another school through the use of the performance module 204, wherein the broadcast of each school's performance can be input into the digital story application 104 via the performance module 204. The timeline module 202, described herein, can be used to synch the broadcast from the first school performing a symphony with the second school's choir. The resulting content from the input via the performance module 204 is a collaborative digital story. By way of a second example, a doctor, as user U in FIG. 1, can use performance module 204 to import an x-ray and use performance module 204 to capture the doctor's voice describing the contents of the x-ray. A patient, as viewer V in FIG. 1, can view the digital story that incorporated the x-ray content page and the voice recording as a diagnosis. The patient, in turn, can provide additional content to the digital story such as the patient's voice describing additional symptoms. The collaborative content from the doctor and the patient is then saved in the digital story database 112 where it may be accessed via the digital story application 104 using the device 102 or device 108.

Sound effect module 206 enables sound effect recording and/or sound effect replacement functionalities. Sound effect module 206 can include a data store of various types of sound effects usable by a user generating or editing a digital story. Sound effect module 206 can display all of the original sound effects on a timeline and enable manipulation of those sound effects, specifically the timing and/or type of sound effect. Sound effect module 206 also enables replacement of sound effect tracks on the timeline. Sound effect module 206 can also enable recording of new sounds, for example, by interfacing with one or more microphone devices. Additionally, sound effect module 206 can access and/or import media files from external locations to supplement available sound effect options. Sound effect module 206 can also access and store recording and/or sound effects as part of the digital story database 112. Sound effect module 206 can be accessed via the digital story application 104. The digital story application 104 can access the network 110 and the digital story database 112 to access additional sound effects. Sound effects that are recorded using the sound effect module 206 such as new sounds can be stored in the digital story database 112, another location on network 110, or an external location. By way of example, the sound effect module 206 can be connected to a third-party service such as Soundsnap.com, a sound effect library. Sounds effects can be added to the sound effect module and then incorporated into the digital story.

Soundtrack module 208 enables management of digital music tracks. Example soundtrack management operations provided by soundtrack module 208 include adding, moving, replacing, and/or deleting digital music files within a soundtrack timeline. Soundtrack module 208 can interface with one or more external music services to access and/or play parts or all of various digital audio tracks. Example third party music streaming applications include, but are not limited to, Spotify, iTunes, Napster, Amazon, and Tidal. In some instances, soundtrack module 208 can enable recording from a phone, computing device, tablet, or other musical recording device, such that the user can record their own musical track and use it during playback of the digital story.

Face replacement module 210 enables replacement and/or integration of faces from photographs accessible by a user with one or more character faces depicted in the digital story. In some implementations, face replacement module 210 is configured to use various infrared and/or three dimensional imaging technology to capture facial features and apply those facial features to one or more characters in the story. In some embodiments, face replacement module 210 can adjust the facial features to the artistic style of the particular artwork in the digital story. Face replacement module 210 can interface with various camera devices hosted by device 102 or 108. In some instances, face replacement module 210 can access previously captured images, identify a face, and use those facial features when replacing faces in the digital story.

Page order management module 212 enables a user to rearrange the content uploaded to the digital story application such as the drawings, images, and pages of the digital story, as well as any collaborative content. That is, drawings, images, pages, and other content in the digital story can be rearranged in any order preferred by the user. The page order management module can take segments selected by a user and move that segment to a different portion of the digital story. By example, if a digital story included segments A, B, and C, the user could move segment B to the end so that the segments would be in the order A, C, and B. The page management order module 212 can also be used to move individual components that are in the digital story. For example, if the digital story included photograph A followed by photograph B and graphic C, the user can use the page order management module 212 to move photograph B and place it before photograph A so that the digital story would display photograph B followed by photograph A and graphic C. The collaborative features discussed herein apply equally to page order management module 212 and all of the modules in general. By way of example, a first user can upload and edit the first 10 pages of a graphic novel text. A second user can upload graphics to be used in connection with pages 1-4 of the graphic novel text. A third user can upload graphics to be used in connection with pages 5-10 of the graphic novel text. The first user can then use the page order management module 212 to re-order the graphic novel text to display on different pages than input by the second and third user.

Pacing module 214 controls playback of the digital story. Broadly, pacing module 214 controls the rate at which pages of a story are viewed based on the user's preferences. Pacing module 214 can coordinate with timeline module 202 such that upon completion of playing audio and/or visual components related to a particular page, a next page is displayed for viewing.

Pacing module 214 can also include transition between the pages of the digital story. For example, pacing module 214 can provide various audio and/or visual transitional effects between pages, such as wipe, fade in/fade out, defocus, cut, etc. Pacing module 214 can also synchronize retrieval and/or queuing of audio and graphical files for a next page to be display.

Sharing module 216 enables digital story content generated and/or edited by the user to be shared with viewer V via network 110. In some instances, sharing module 216 enables collaboration across network 110, such that users in different locations can collaborate on the digital content. By way of a first example, a first user will generate a digital story via the digital story application 104. The digital story can be saved in digital story database 112 or at another location. Using the sharing module 216, the first user will share the digital story with the second user. The sharing can be via a link to the saved content or as a packet of information that is sent directly to the second user. The second user will access the digital story generated by the digital story application 104 and add, delete, or modify the content. By a second way of example, two or more users will access the digital story application via the sharing module 216. The two or more users will then use the sharing module 216 to create the digital story, edit and modify the digital story, and add components to the digital story in collaboration with one another. Digital stories generated and/or edited by digital story application 104 can be shared and/or exported as various file types, such as video files, that can be played within digital story application 104, within a third party application that digital story application 104 is a plugin for, and/or a separate video viewer. In some instances, sharing module 216 can enable sharing links and/or videos via various social media platforms, such as Facebook, Twitter, Instagram, TikTok and the like or other platforms to distribute content such as podcasting, vlogging, or non-fungible token marketplaces.

Photo integration module 218 enables texture mapping and/or replacement of backgrounds and surfaces with digital image files. For instance, photo integration module 218 can access digital image files stored locally or remotely, and replace a background with a user's photos, models, animations, and other digital renderings. The photo integration module 218, like the other modules disclosed herein, enable users to create new digital stories and other content, to collaborate on the creation of content, and to share content.

Figure 3:
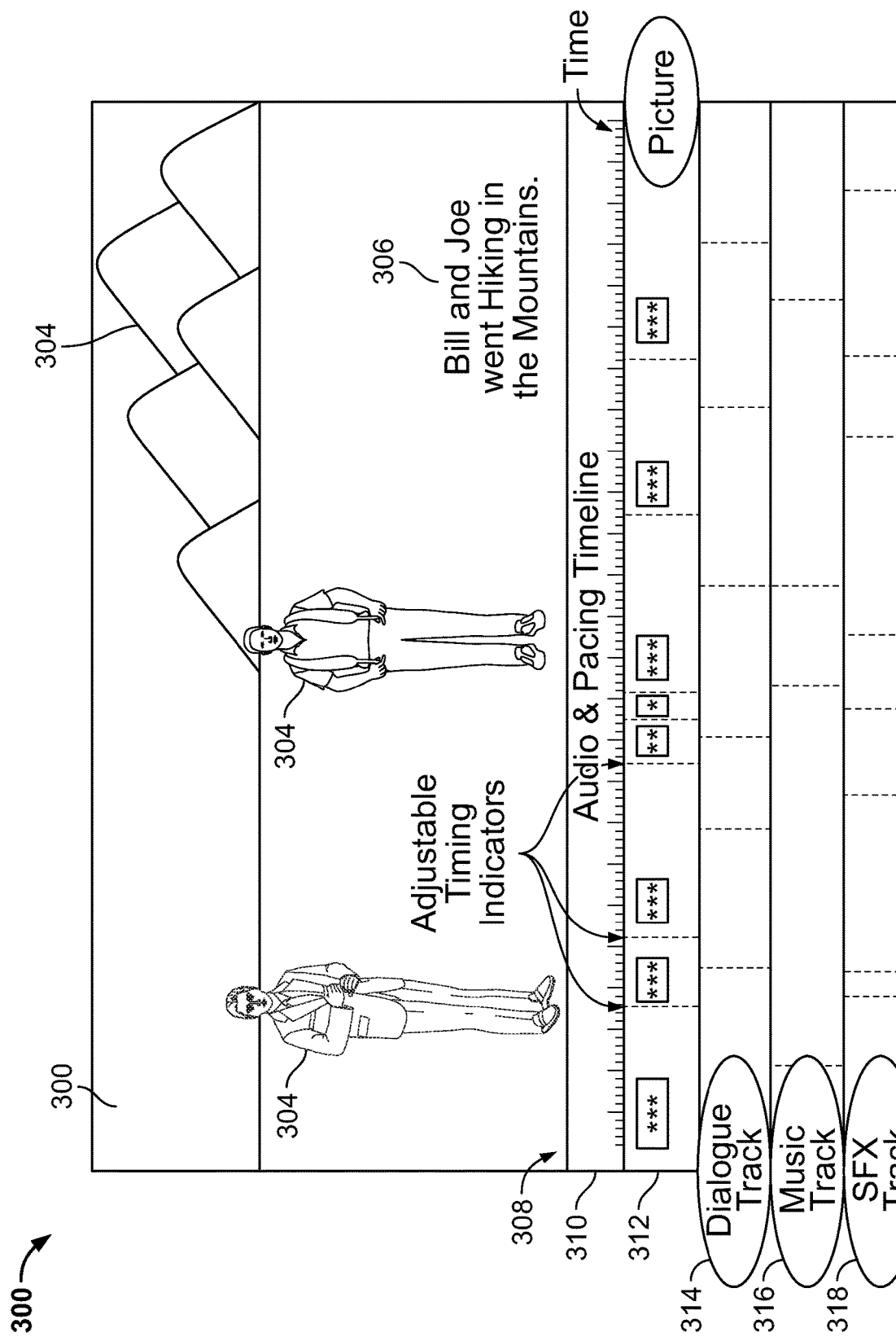
FIG. 3 illustrates an example interface provided by the example digital story application of FIG. 2.

FIG. 3 illustrates an example interface 300 generated by digital story application 104. The example interface 300 can be displayed on a variety of computing devices, as noted above. Some functionalities may be modified for mobile computing devices having smaller display screens. Other embodiments can include more or fewer components.

Generally, interface 300 enables a user to edit and generate one or more pages of a digital story. Interface 300 enables a user to view visual content and coordinate one or more audio components relating to a given page of a digital story. Interface 300 can also enable a user to view multiple pages simultaneously, reorder the pages, and/or manage transitions between pages. In some instances, interface 300 is loaded from previous work performed by a different author. Thereby, a user can modify and build upon work performed by others. While a digital story is used as the example in interface 300, the term "a digital story" or "digital stories" is meant to be broad and include any content that may be digitized, including text files, video files, audio files, graphic files, and other formats that may be digitized.

Example interface 300 includes story frame 302. Story frame 302 depicts, generally, what would appear on a page of a book. Typically, story frame 302 shows a single page of a digital story at a time. It will be appreciated that embodiments where the digital story is another form of communication, such as a greeting card, story frame 302 would correspond to one or more pages of that medium.

Within story frame 302 one or more visual aspects 304 are displayed. Within story frame 302 one or more textual aspects 306 can also be displayed. In some instances, story frame 302 enables the user to adjust the configuration and/or sizing of visual aspects 304 and/or textual aspects 306. In some instances, story frame 302 can include captions showing words that were spoken in one or more audio tracks transcribed for display on a screen.

Example interface 300 also includes timeline 308. Timeline 308 enables configuration of audio for the particular page shown in the interface 300. Using the timeline, and/or one or more other functionalities provided by digital story application 104, a user can insert new audio aspects, remove audio aspects, and change the timing and/or relative positioning of various audio aspects. Timeline 308 also enables the user to adjust pacing of a particular page.

Included in timeline 308 is elapsed time bar 310. Elapsed time bar 310 shows a scale starting at zero seconds and provides an indication of when various audio aspects play during playback of the particular page. Timeline 308 also can include visual track 312. Visual track 312 shows timing of the appearance or disappearance of various visual aspects in story frame 302. In some instances, aspects in visual track 312 are animated or recorded videos.

Timeline 308 can also include dialogue track 314. Dialogue track 314 shows relative timing of dialogue relating to story frame 302. For instance, dialogue track 314 can show timing of when a reader's voice will play during playback of story frame 302. A user can utilize dialogue track 314 to adjust spacing between playback of various dialogue files.

Example timeline 308 can also include music track 316. Music track 316 shows what type of music and at what time it is played during playback of the page. Music track 316 enables a user to select various parts, or all, of a music track. Music track 316 can also display metadata relating to the musical track, such as an artist name, a song title, and/or an album name.

Timeline 308 can also include sound effects track 318. Sound effects track 318 enables a user to manipulate the timing of various sound effects during playback of story frame 302. Sound effects track 318 can also include labels of soundtracks, such as file names or descriptions of the sound effect.

Figure 4:
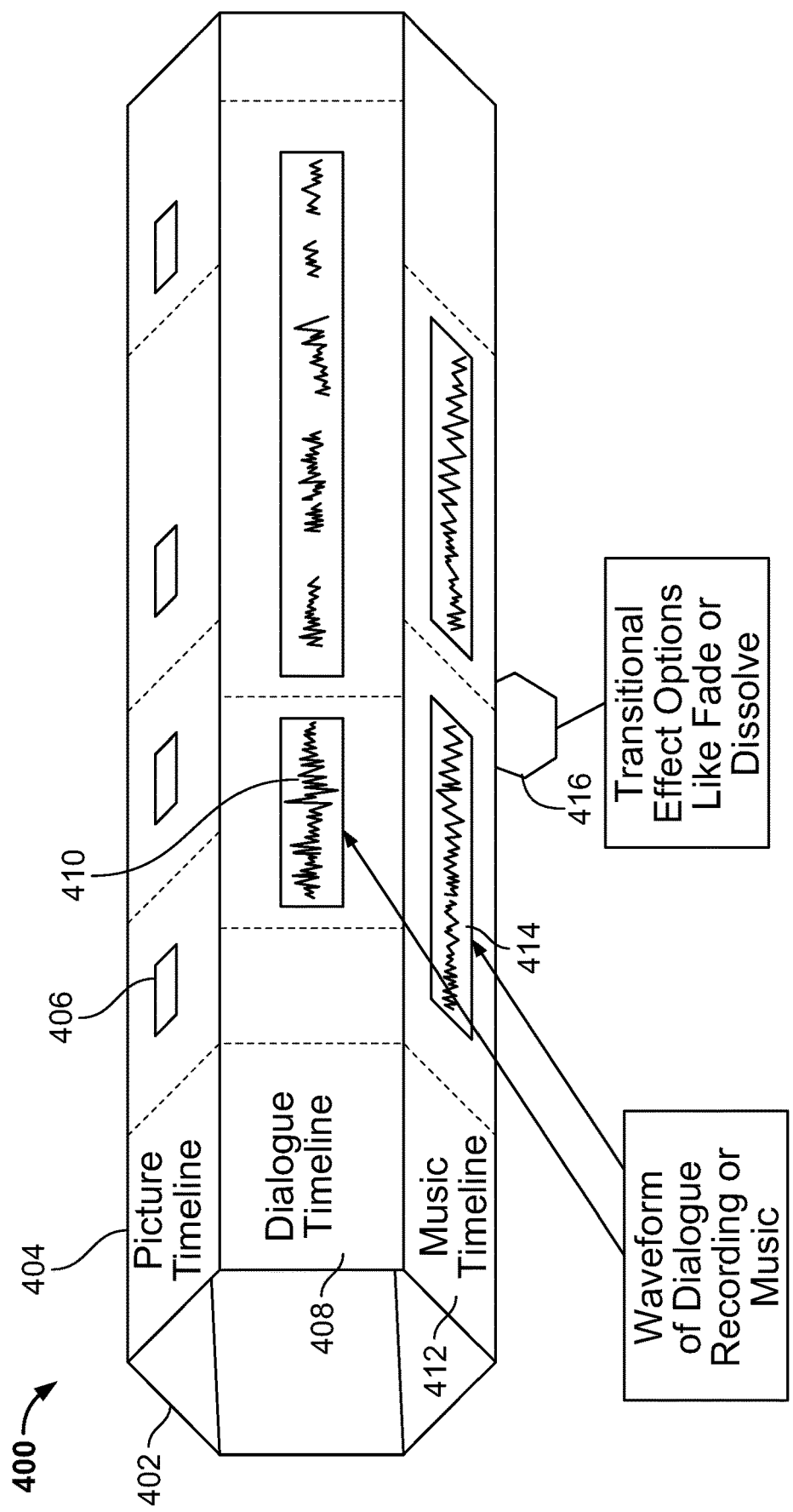
FIG. 4 illustrates another example interface provided by the example digital story application of FIG. 2.

FIG. 4 illustrates an example editing interface 400. Example editing interface 400 can be shown at the same time as example interface 300. In other instances example interface 400 appears as a separate interface from interface 300.

Example editing interface 400 includes tumbler 402. Tumbler 402, broadly, is a graphical representation of various tracks for a particular page of a digital story. In some instances, tumbler 402 can be depicted as a rotatable polyhedron, where a number of faces of the polyhedron corresponds to the number of distinct timelines for the given page in the digital story. At any given time during display of tumbler 402, one or more timelines can be simultaneously displayed. As shown, three sides of tumbler 402 are displayed. However, in other instances more or fewer timelines can be simultaneously displayed.

Example editing interface 400 includes three timelines: picture timeline 404, dialogue timeline 408, and music timeline 412. Additional timelines may be present for this particular example page of the digital story. However, any additional timelines are hidden by the sides of the polyhedron that are currently visible to the user.

Picture timeline 404 includes one or more picture thumbnails 406. Picture thumbnails 406 are shown on the timeline corresponding to when each picture is displayed during playback of the given page.

Dialogue timeline 408 includes one or more dialogue waveforms 410. Dialogue waveform 410 can be a schematic representation of a generic waveform or, an accurate rendering of a waveform corresponding to the dialogue track. Dialogue timeline 408 enables a user to control playback timing and length of each dialogue track.

Music timeline 412 includes one or more music wave forms 414. Music timeline 412 enables the user to manipulate relative timing and other playback aspects of each audio file. In some instances, music timeline 412 can include transitional effect indicator 416. Transitional effect indicator 416 can indicate that some transition is applied between different audio tracks. In some instances, transitional effect indicator 416 can also indicate a type of transitional effect, such as fade or dissolve.

Figure 5:
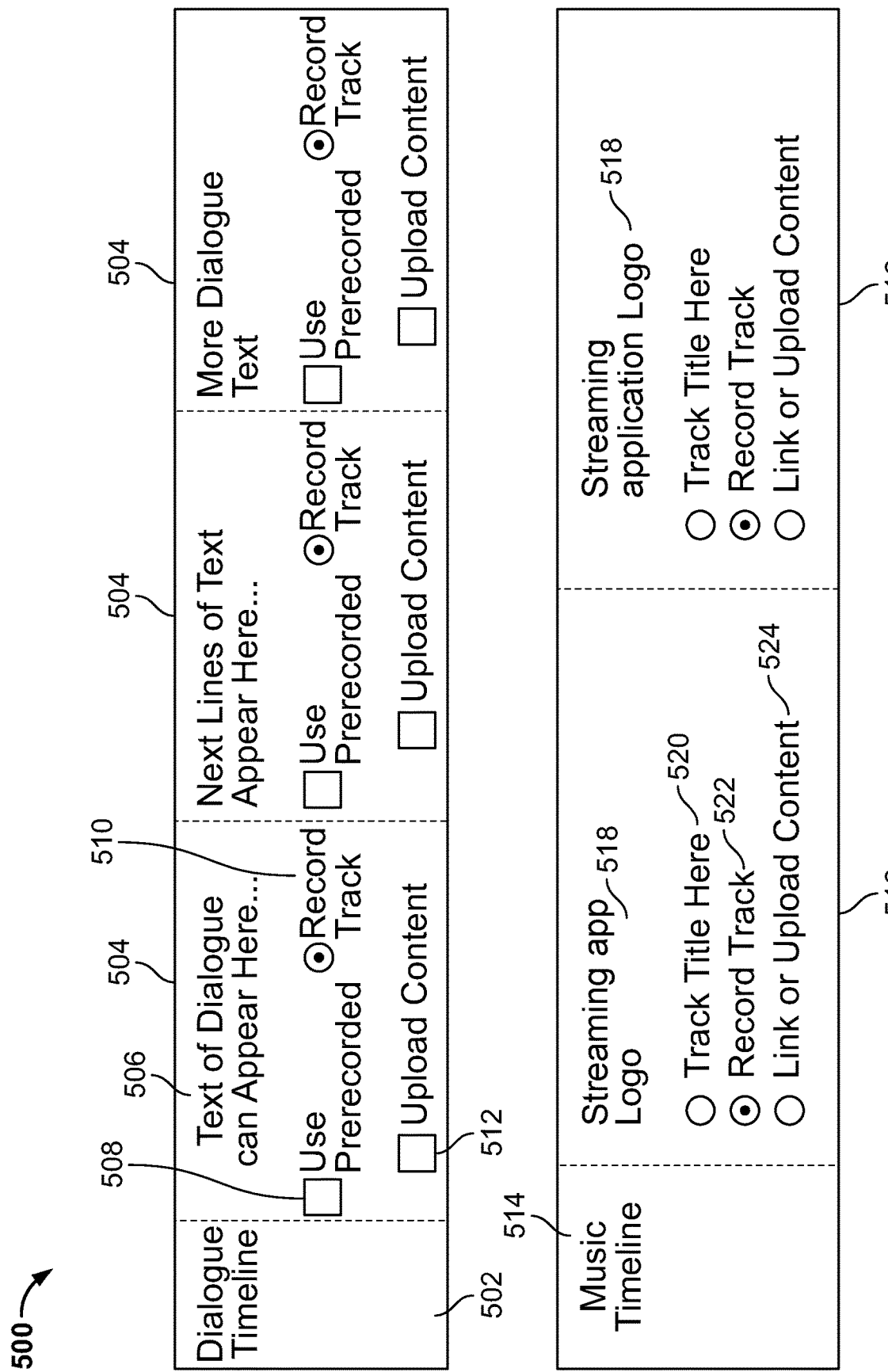
FIG. 5 illustrates another example interface provided by the example digital story application of FIG. 2.

FIG. 5 illustrates example interface 500. Example interface 500 can be displayed along with, or separately from, example interfaces 300 and/or 400. Example interface 500 enables selection of, or recording of, various attributes of the page of the digital story. For instance, interface 500 enables selection of various digital files corresponding to dialog, music, sound effects, and photographs. Accordingly, it will be appreciated that similar designs for other modules and/or timelines would be included. Dialogue and music timelines are shown in interface 500 for explanatory purposes and not as a limitation of what can be included in interface 500.

Example interface 500 includes dialogue timeline 502 and music timeline 514. Dialogue timeline 502 includes one or more dialogue parts 504. As shown, three dialogue parts 504 in dialogue timeline 502 correspond to three distinct and/or separate dialogue audio files that can be played for a particular page in the digital story.

Dialogue part 504 includes various tools for selecting digital files corresponding to dialog. In some instances, dialogue part 504 includes transcribed dialogue text 506. Dialogue part 504 can also include prerecorded selector 508. Prerecorded selector 508 enables a user to select a file stored locally or remotely that has dialog. Dialogue part 504 can also include record new track selector 510. Record new track selector 510, when selected, can initiate recording of a new dialogue track. Dialogue part 504 can also include upload selector 512. Upload selector 512 enables a user to upload recorded dialogue tracks to remote storage for later retrieval.

Music timeline 514 includes one or more music parts 516. Each music part 516 enables the user to select digital files for playback for a particular page of the digital story. Music part 516 can include streaming service indicator 518. Streaming service indicator 518 can include a logo for a particular streaming service, such as a Spotify, Napster, or iTunes logo. Music part 516 can also include track name indicator 520. Track name indicator 520 can include data about a selected digital file, such as artist name, song title, and/or file name.

Music part 516 can include record track 522. Record track 522 initiates recording of an audio file that can be used for music during playback of the page of the digital story. Music part 516 can also include upload selector 524. Upload selector 524 enables a user to link to a remote file and/or upload recorded content.

Figure 6:
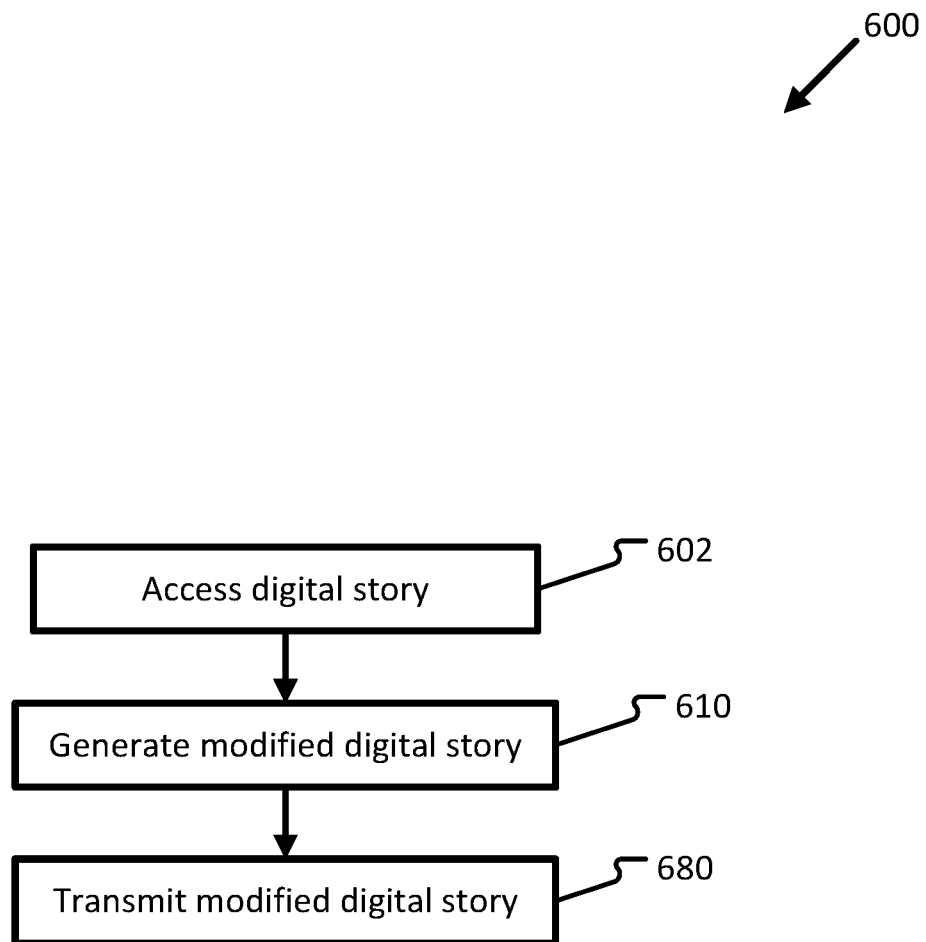
FIG. 6 shows an example method for generating a digital story using the example digital story environment of FIG. 1.

FIG. 6 shows example method 600 for generating a digital story. Example method 600 includes accessing a digital story (operation 602), generating a modified digital story (operation 610), and transmitting the modified digital story (operation 680). Although example method 600 is described in terms of editing an existing digital story, it will be appreciated that various principles and operations described below regarding example method 600 can be applied to generating a new digital story. Other embodiments can include more or fewer operations.

Example method 600 begins by accessing a digital story (operation 602). Accessing the digital story (operation 602) can include communicating with local and/or remote storage to access the digital story one and/or files associated with the digital story. For example, accessing digital story (operation 602) can include communicating with a remote server and requesting the digital story from a digital story database. Typically, the digital story will include one or more pages, where each page has visual and/or textual aspects, along with one or more audio components. Accessing the digital story (operation 602) can also include populating an interface with each aspect of the digital story (the visuals, textual aspects, and audio aspects).

Figure 7:
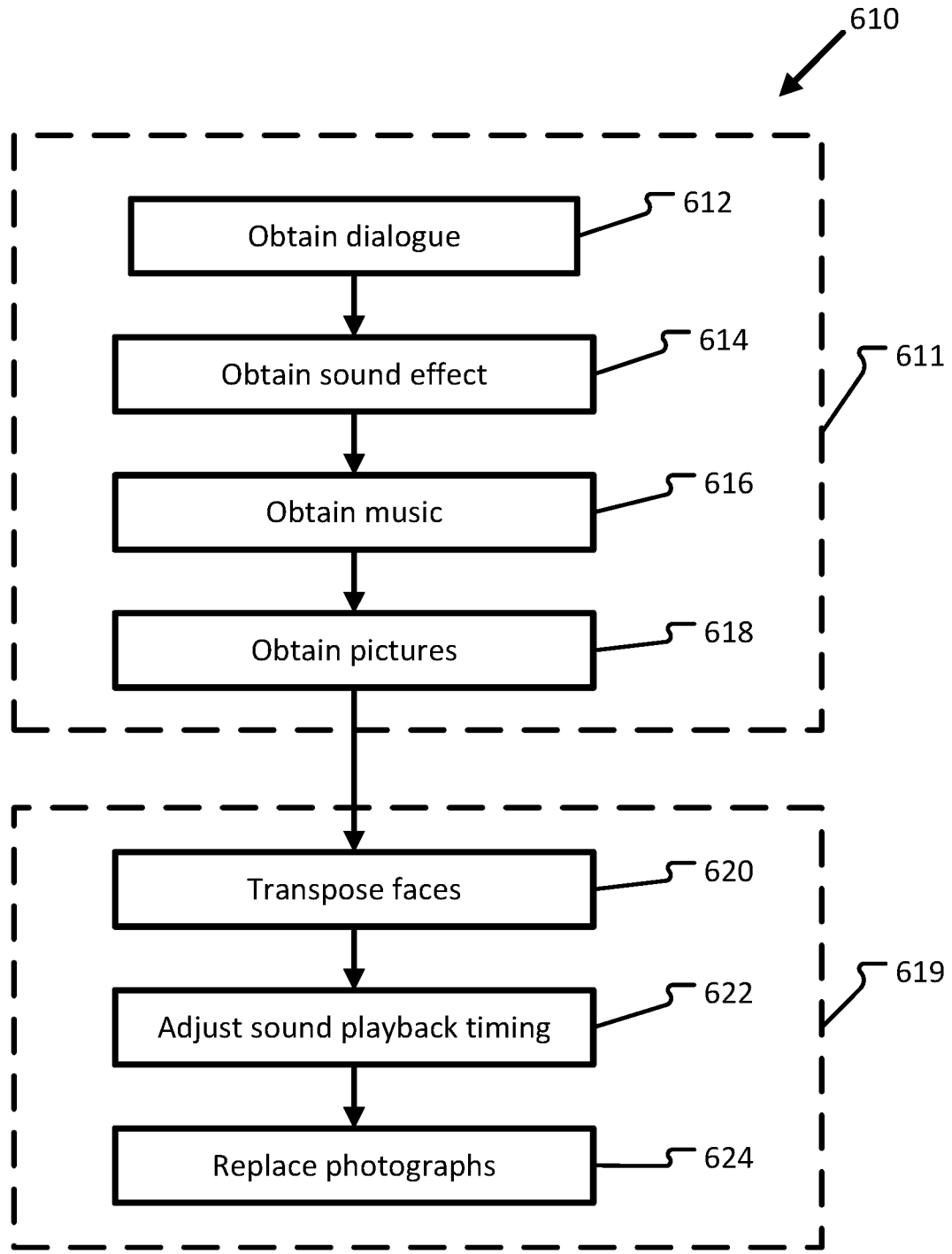
FIG. 7 shows example operations performed during the modified digital story generation operation of FIG. 6.

Next, a modified digital story is generated (operation 610) after receiving one or more inputs from a user. Referring now to FIG. 7, various operations that can be included in generating the modified digital story (610) are shown. Operations shown in FIG. 7 can be performed in a different order than that shown.

Broadly, generating a modified digital story (operation 610) can be grouped into one or more obtaining actions (operation group 611) and one or more modification actions (operation group 619). Operation group 611 typically involves obtaining pre-recorded or pre-existing files. Operation group 611 can also include obtaining live performances and recording them and generating new files, as well as capturing photographs and storing digital files of the photographs. Operation group 619 generally involves adjustments made to the page in the digital story, between playback of the pages in the digital story, and/or the timing of digital or audio aspects of the page playback.

Generating a modified digital story (operation 610) can include obtaining dialogue (operation 612). Obtaining dialogue (operation 612) can include accessing a digital audio file and/or receiving a recording of one or more dialogue tracks. Obtaining dialogue (operation 612) can also include communicating with one or more microphone devices to record dialogue from a user.

Obtaining sound effects (operation 614) can include accessing pre-recorded sound effects and/or interfacing with microphone devices to record and generate new sound files. Obtaining music (operation 616) can include accessing locally or remotely stored files of digital audio tracks. Obtaining music (operation 616) can also include determining communications through application programming interfaces with third party streaming applications. Obtaining pictures (operation 618) can include accessing locally or remotely stored photographs. Obtaining pictures (operation 618) can also include capturing one or more photographs with a camera device and saving one or more digital image files.

Transposing faces (operation 620) can include replacing faces selected by a user in one or more photographs with one or more faces identified by a user as characters in the story (or images in the story). Transposing faces (operation 620) can also include adjusting the face identified by the user to match artistic qualities of the faces in the images of the digital story.

Adjusting sound playback timing (operation 622) includes receiving indications from a user via a graphical user interface to adjust one or more of soundtrack, sound effect, dialog, and other audio aspects, and their timing during playback of the page of the digital story. Replacing photographs (operation 624) can include inserting and/or replacing background photographs for particular pages in the digital story.

Referring again to FIG. 6, after generating the modified digital story (operation 610), the modified digital story is transmitted (operation 680). Generally, transmitting the modified digital story (operation 680) involves communicating the modified digital story to another computing device for subsequent accessing, viewing, and/or editing. Accordingly, transmitting the modified digital story (operation 680) can include, for instance, communicating with a remote server and/or a database hosted by a remote server. Transmitting the modified digital story (operation 680) can also include sending a link to the modified digital story.

Figure 8:
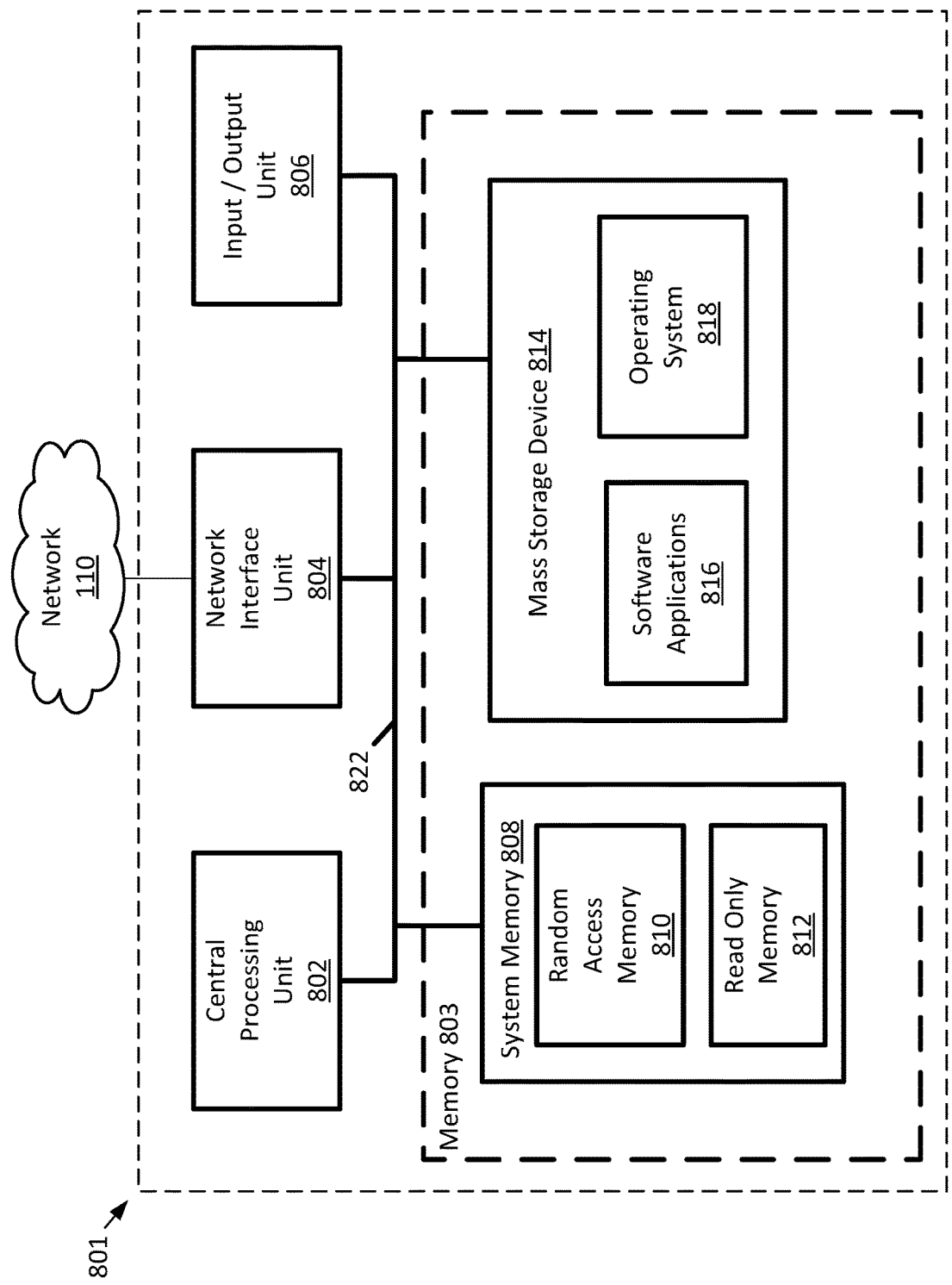
FIG. 8 shows example physical components of a computing device of the digital story environment shown in FIG. 1.

FIG. 8 shows example computing device 801 used in example digital story environment 100. For instance, some or all components of example computing device 801 are found in device 102, server 106, and/or device 108. Device 102 and device 108 include mass storage device 814 hosting one or modules of digital story application 104. Digital story application 104 is capable of performing one or more operations described herein, such as example process 600.

As illustrated, the example computing device 801 includes at least one central processing unit ("CPU") 802, memory 803, and a system bus 822 that couples memory 803 to the CPU 802. Memory 803 includes system memory 808 and mass storage device 814. System memory 808 includes a random access memory ("RAM") 810 and a read-only memory ("ROM") 812. A basic input/output system that contains the basic routines that help to transfer information between elements within the example computing device 801, such as during startup, is stored in the ROM 812. Memory 803 further includes mass storage device 814. Mass storage device 814 is able to store software applications 816 and data.

Mass storage device 814 is connected to CPU 802 through a mass storage controller (not shown) connected to the system bus 822. Mass storage device 814 and its associated computer-readable data storage media provide non-volatile, non-transitory storage for the example computing device 801. Although the description of computer-readable data storage media contained herein refers to a mass storage device, such as a hard disk or solid state disk, it should be appreciated by those skilled in the art that computer-readable data storage media can be any available non-transitory, physical device, or article of manufacture from which a computing device can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the example computing device 801.

According to various embodiments, the example computing device 801 may operate in a networked environment using logical connections to remote network devices through the network 110, such as a wireless network, the Internet, or another type of network. The example computing device 801 may connect to the network 110 through a network interface unit 804 connected to the system bus 822. The network 110 may be a protected network, as discussed above. It should be appreciated that the network interface unit 804 may also be utilized to connect to other types of networks and remote computing systems. The example computing device 801 also includes an input/output controller 806 for receiving and processing input from a number of other devices, including a touch user interface display screen, or another type of input device. Similarly, the input/output controller 806 may provide output to a touch user interface display screen or other type of output device.

As mentioned briefly above, the mass storage device 814 and the RAM 810 of the example computing device 801 can store software instructions and data. The software instructions include an operating system 818 suitable for controlling the operation of the example computing device 801. The mass storage device 814 and/or the RAM 810 also store software applications 816, that when executed by the CPU 802, cause the example computing device 801 to provide the functionality of the example computing device 801 discussed in this document. For example, the mass storage device 814 and/or the RAM 810 can store software instructions that, when executed by the CPU 802, cause the example computing device 801 to display a digital story application interface on the display screen of the example computing device 801.

Figure 9:
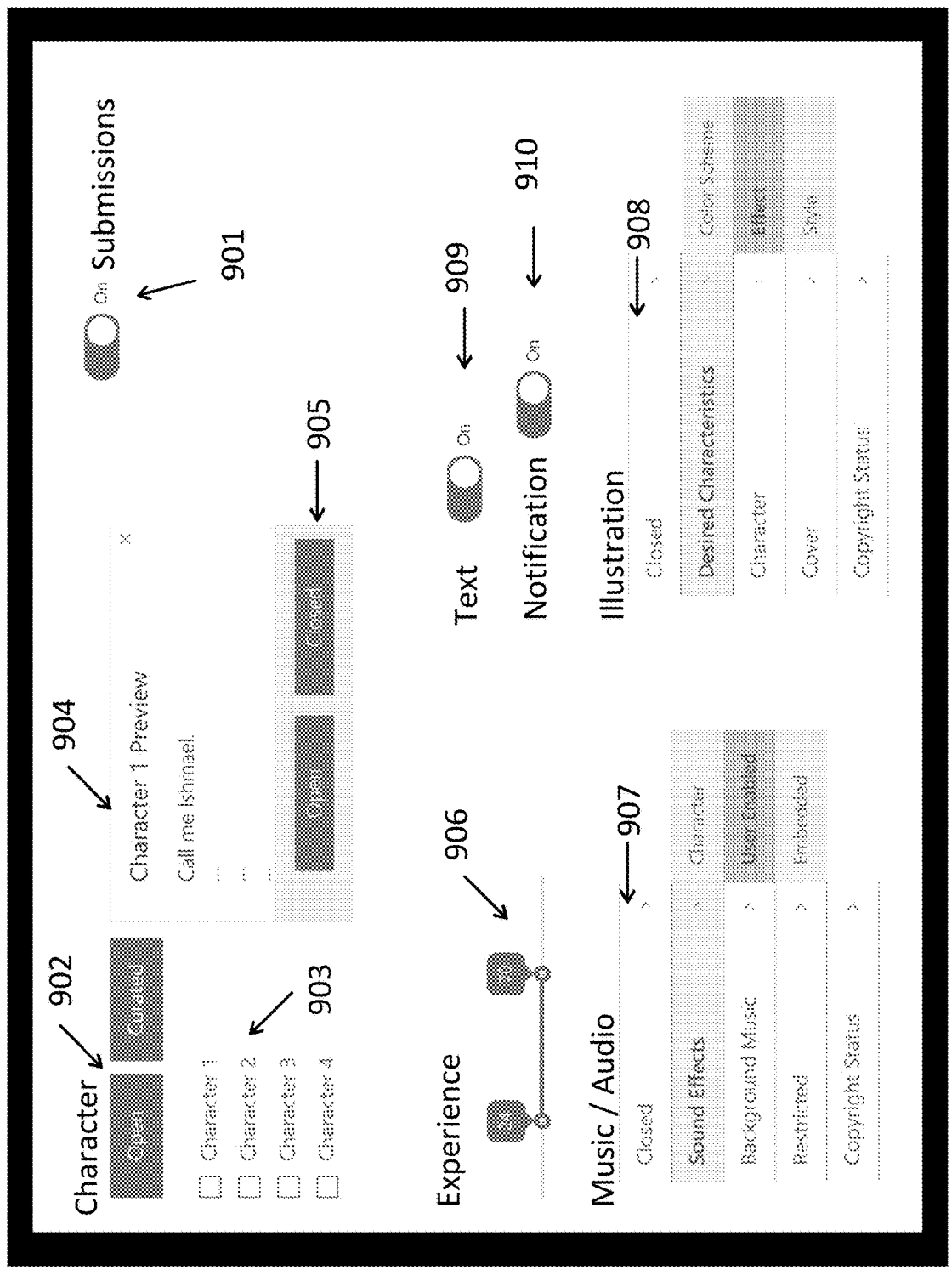
FIG. 9 shows example author control module.

FIG. 9 shows example author control module 900. Author control module 900 can be used in connection with digital story application 104 or as a separate application that is connected to digital story application 104. Author control module 900 can use the same connectivity described in connection with digital story application 104 and may be used in connection with device 102, device 108, or another device. Author control module 900 enables the user U, described in FIG. 1, to control collaboration of the digital story.

Submissions toggle 901 can be used to determine whether a story uploaded to the system is available for third party collaboration. Submissions toggle 901 can be any form of device that selects whether the digital story is available for collaboration. Variations of Submissions toggle 901 can include a toggle, a button, a switch, or other means that shows the digital story is available for third parties to collaborate. Submissions toggle 901 can have varying degrees of collaboration associated with it. Submissions toggle 901 can be a simple on-off switch that either says no collaboration or everyone is able to collaborate. Submissions toggle 901 can also be more complex in that it may permit only authorized or selected users to submit collaborations. Submissions toggle 901 can also be a different format that permits application to submit and allows user U to select which users may provide submissions. The foregoing are mere examples of the variations that the Submissions toggle may take.

Character module 902 can be used to select which, if any characters, are available for collaboration. Third parties may desire to read for a particular part of the digital story. The user U can used character module 902 to set whether the characters roles are open or curated. By selecting "Open" in Character module 902, user U permits all characters to be open for collaboration. By selecting "Curated" in Character module 902, user U will select, which, if any characters are open for collaboration. The "Open" and "Curated" options are mere examples of the selections that can be available in the system. Other examples of options that can be used are "Closed" to signify that no characters are open for collaboration and "Multiple" to signify certain characters are available for more than one person to collaborate. One of ordinary skill will understand there are various other categories that can be used in connection with Character module 902.

Character select module 903 can be used to select a subset of characters that are available for collaboration. One form of collaboration is reading the part of the character. Another form of collaboration is illustrating. It is understood that there can be multiple forms of collaboration and that the interface associated with character select module 903 can be modified to fit the needs of the user. The check boxes associated with character select module 903 can be modified to fit the needs of the user. The check boxes are merely used as one example.

Character preview module 904 can be used to preview the text associated with a character in a digital story. The text, such as "Call me Ishmael" from Moby Dick, is set forth in the preview pane associated with Character preview module 904. Selection buttons 905 can be used to determine whether the character is open for collaboration or closed to collaboration. It is understood that character preview module 904 can run independently of character module 902 and character select module 903 or character preview module 904 can be linked to character module 902 and/or character select module 903. A linked system would permit a user to select a character as having an open role in character preview module 904, which would automatically select that character as open in character select module 902 and turn character module to "Open." It is understood that linking character module 902, character select module 903, and character preview module 904 can take several forms. Character preview module 904 includes optional Character select buttons 905. Character select buttons 905 include "Open" (open for collaboration) and "Closed" (character not open for collaboration). It is understood that other variations can be used and "Open" and "Closed" are used for exemplary purposes only. Character select buttons 905 can take various forms and are not required to be buttons.

Experience level module 906 can be used to adjust the level of experience required for a particular character role. Experience level module 906 can be set to associate with all characters or can be set separately for each character role. It is understood that the toggle bar that is used as experience level module 906 is one example of a format to select experience, and that multiple forms are optional. Experience level module 906 has an lower level (24) and upper level (70) of experience for exemplary purposes. Unlike other casting circumstances that require only a minimal level of experience, experience level module 906 also includes a maximum level of experience to permit actors and others who desire to collaborate to have more opportunity. The user that sets experience level module 906 can dictate the level of experience. By setting the lower level higher, a contributor will be required to have more experience to participate and may be rejected as not being qualified for the character role. Likewise, an experienced collaborator who has had multiple roles may also be excluded if the user desires to open the collaboration only to those who have not had prior opportunity. Experience level can be established multiple ways. An exemplary way to establish an experience level is to have collaborators sign up for an account in connection with the digital story system. Collaborators who are selected for a character role can gain experience points. Those experience points are calculated and establish an experience score. In turn, that experience score can be associated with the numerical scale associated with experience level module 96, which is a 0-100 scale with the levels 24-70 selected. Another manner in which to establish an experience level is to have collaborators fill out a form related to prior collaboration experience, which may include acting or other performance roles. An actor such as Dustin Hoffman may have a high experience score based on multiple Hollywood movie roles. A new actor without any Hollywood movie roles would have a lower score. These scores can then be calculated and associated with the experience level module 906.

Music/audio module 907 can be used to select collaborators who contribute music and audio to the digital story. A user can select to close off the system to third party collaboration as indicated by the "Closed" selector on the music/audio module 907. Exemplary sounds that may be added via the music/audio module include sound effects and background music. It is understood that these are exemplary and that any form of sound, whether music, audio, or other file may be added to the collaboration via the music/audio module 907. One form of the music/audio module 907 is an expandable menu. A user may select to close off all sounds, which would eliminate the opportunity for the collaborator to upload any sound file to the collaboration. If the user chooses to allow collaboration (not close), the user may then modify the system to allow for certain types of audio files, all of which are customizable by the user. Music/audio module 907, for example, can be used to turn on collaboration of sound effects. If the user turns on collaboration of sound effects, an expanded menu will open to determine what types of sound effects are subject to collaboration. Examples include character sounds, user enabled sounds (sounds that are available when the reader is reviewing the digital story), and embedded sounds (sounds that are embedded at certain parts of a story, such as the sound of a lighting when the words "It was a dark and stormy night" were read). It is understood that there can be variations of sound effects that can be turned on and off. The user has the ability to control what is available for collaboration. In turn, a collaborator will only see what is available when reviewing the potential collaboration. By example, if the user removed character and user enabled sound effects, and greenlighted embedded sound effects, the collaborator would only see embedded as available to collaborate with. Other sound options in music/audio module 907 include background music, which is music that is delivered in the background of the digital story. There can be other variations of sound that are input into music/audio module 907.

Music/audio module 907 can also be used to restrict certain sounds, music, and audio files. For example, an author using the digital story environment may not want to allow rock music for a bedtime story. In such case, the user may use music/audio module 907 to restrict a certain type of music, music by a specific band, music by a specific artist, or music during a certain time period. Various other forms of restriction can be applied to the restrictions portion of the music/audio module 907.

Music/audio module 907 can also be used to monitor the copyright status of sound files that are uploaded as part of collaboration. By way of example, a user may only permit sound files that are in the public domain. The user can select the copyright status to public domain and all other files would be restricted and could not be uploaded. By way of another example, a user may only permit music that has be pre-approved for use in the system. This can occur through licensing or confirmation of public domain status. A store of sound files can be stored in the system, linked via streaming service, or otherwise linked to the system as available files. Those files can be populated for the collaborators to use when collaborating on a digital story. If the user selected only pre-approved, the collaborator would not be permitted to upload or use sound files not on the pre-approved list. By way of another example, the user may not place restrictions on any copyrights, which would enable the collaborators to upload, link, or use any sound file, regardless of copyright rights.

Illustration module 908 can be used to adjust the level and type of collaboration associated with illustration or graphics of the digital story. A user that has a fully illustrated digital story may not want third party collaboration in connection with illustration. In that example, the user may opt to close illustration to collaboration. If the user opens illustration to collaboration, then the user will have a series of options available in which to allow collaboration. The user may also designate the type of illustration that will be acceptable to the user so that would-be contributors understand the type of illustration desired by the user. By way of example, a user may have text to a children's book, but not have the skill or means to illustrate the book. That user can use the author control module 900 to determine to what aspects of the book third parties may contribute. Illustration module 908 controls the illustration. A user using the system to collaborate with an illustrator may set desired characteristics in the illustration module to set a desired color scheme (e.g., bold colors or patriotic colors), medium (e.g., chalk, watercolor, acrylic, digital), and style (e.g., modern or classic). It is understood that the foregoing are mere examples of the options that can be available in the system.

Illustration module 908 can also be used to illustrate portions of the digital story, such as a character or a set of characters. Upon activating the character option of the illustration module 908, the user may further specify desired characteristics of the character, which will provider collaborators ideas on what will be acceptable.

Illustration module 908 can also provide for collaboration on other aspects of the digital story, including the cover art. The user can specify particularities desired in connection with the cover art so that collaborators are aware of the preferences.

Illustration module 908 can also have copyright status options. By way of example, the user may only want to use new illustration. The user may select new only and restrict any previously used illustrations. By way of another example, the user may want to confirm that the collaborator is the owner of all right, title, and interest, associated with the illustration, and may require sign off on that fact as part of the illustration module.

The modules of author control module 908 can work independently of one another or may work together. Descriptions of the menu systems associated with one of the modules is intended to work on other modules set forth herein, including the format and layout of the menu systems.

Text module 909 enables editing text. Text module 909 can be a toggle switch that enables the user to determine whether the text uploaded to the system may be edited. Certain author users may not want text edited, and the toggle switch of text module 909 can be turned off to prevent text editing. Other author users will desire the ability of third-party collaboration related to the uploaded text. In such cases the user may turn on the toggle switch to on and permit third party collaboration related to the editing. Text editing applications can be employed to permit the editing of text associated with the system. An artificial intelligence application can be included with the text module that will enable automated editing of the text. A natural language text editing application can also be employed with the system that will create different versions of the text.

Collaborative text writing can also be included in the text module 909. Character preview module 904 includes a text application, which can be added to text module 909 to enable collaboration. A first user can submit text for inclusion in a digital story. The text of the digital story can be uploaded to the system and saved on the system in a database, a cloud environment, or in another storage system connected to the system. A second user can be given access to the first user's submitted text and can edit or add to the text. A subsequent user or users can continue to collaborate on the editing of the text. By way of example, a first user may enter the title of a digital story and write a first paragraph. The first user can then upload the title and first paragraph text to the digital story application. The first user can permit the text to be edited via the digital story application. Other users, in this example 30, each then write additional paragraphs to the digital story, resulting in a 45 paragraph short story. The short story can be saved and then submitted for further collaboration related to character readings, sound and audio additions and illustration. Other users can collaborate to add additional content to the digital story. Either the first user or any of the subsequent users can save a version and make that version available for publication or further collaboration on a separate digital story track.

Notification module 910 can provide notification to collaborators regarding the status of a collaborator's content. By turning on the toggle switch of the system, the system can send a notification to the collaborator related to various status updates related to the use of the collaborator's content. Example notifications include: collaborator's content was uploaded and saved on the system, the user who posted the original text of the digital story has viewed the content, or the user has selected the collaborator's content for inclusion in the digital story. The notification module 910 can also be used to provide details related to any monetization of the digital story and the collaborator's share of the monetization. The notification module 910 can be linked to a database in the digital story system environment, to a cloud file, or to another database linked to the system. The notification module 910 can be linked to a user's email address, text message system, or other communications means so that the notifications generated from the system can be delivered to the user.

The notifications system of the notification module 910 may be one way, two way, or multiple way communications, where notices may be responded to or acknowledged. In one application of a response notification, an initial notification is generated via the digital story environment and sent to a collaborator to inform the collaborator that the collaborator's contribution was selected to be included in the digital story. The notification can also include a response that confirms the contributor permits the collaboration to be included in the digital story. A link may be provided in the notification that allows the collaborator to view the final story before agreeing to have the collaborator's content included in the digital story. Upon review, the collaborator can agree to reject including of the collaboration. By way of a different example, the notification module 910 can be used to request that the collaborator respond with additional information necessary to publish the digital story. The notification module can be combined with other modules of the system to include additional functionality. Included in the notification module are standard communication applications that can be added to applications, websites, and other digital media.

All revisions by collaborators of the modules associated with author control module 900 can be tracked via the system to understand which user made any particular change to the digital story. The digital story application can track the users that were associated with any particular digital story and the level of contribution. Tracking the level of collaboration can provide details related to authorship, rights associated with a digital story, and monetization associated with a digital story. It is understood that there can be royalty free versions of the digital story available, but also that versions may bear royalties. By tracking the submissions of the users, the system can divide the royalties among all or a portion of the contributors.

Figure 10:
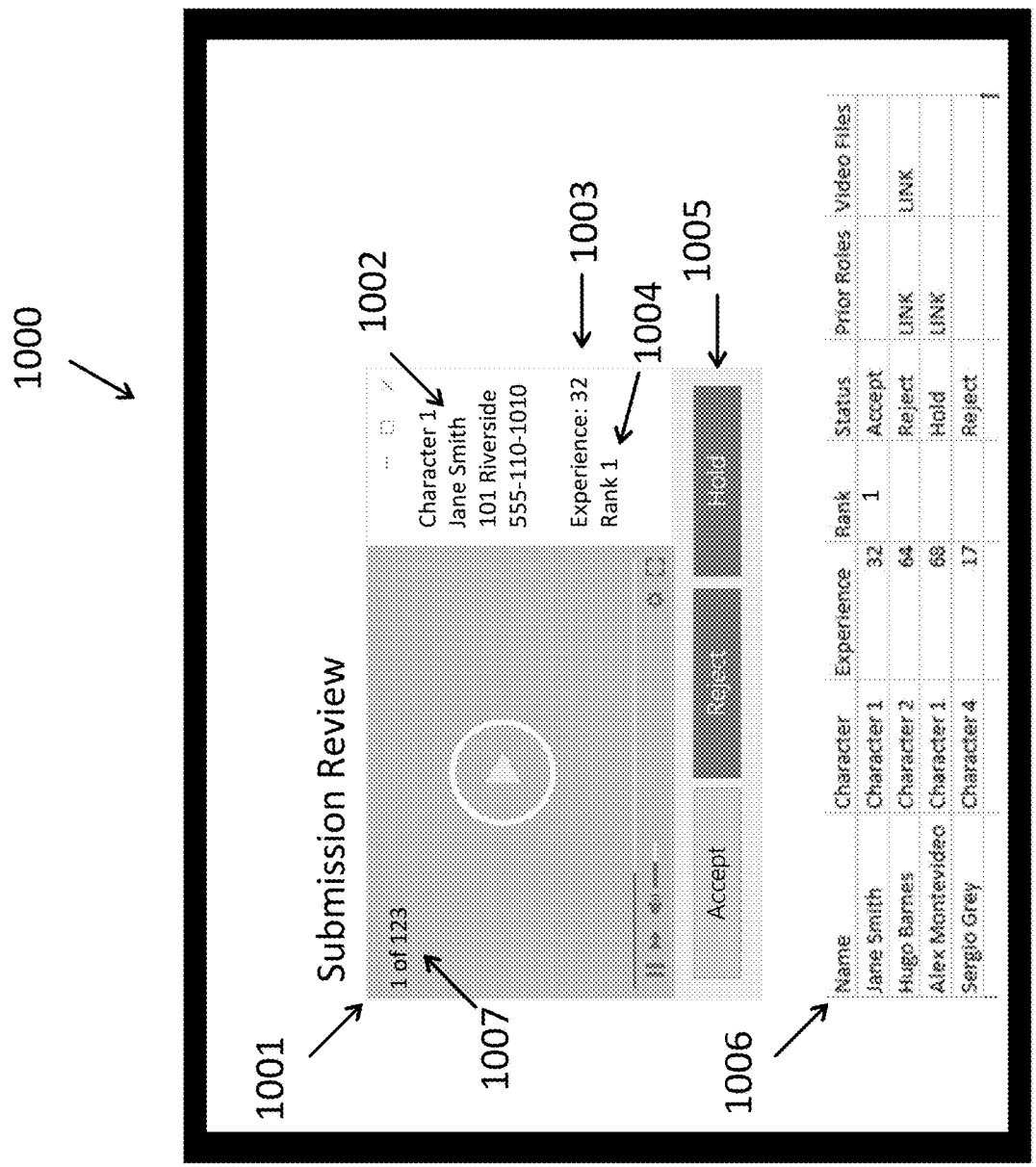
FIG. 10 shows an example submissions review module.

FIG. 10 shows an example submissions review module 1000. Submissions review module 1000 can be used in connection with digital story application 104 or as a separate application that is connected to digital story application 104. Submissions review module 1000 can use the same connectivity described in connection with digital story application 104 and may be used in connection with device 102, device 108, or another device. Submissions review module 1000 enables the user U, described in FIG. 1, to control collaboration of the digital story.

Collaborator submissions review module 1000 enables the user to review any submissions from collaborators to the digital story. Collaborators may, by way of example, contribute to the digital story in the form of reading specific characters, adding sound effects, and providing illustrations. Those collaborations are uploaded to the digital story environment and stored on that system or a networked or linked system. The user who uploaded the original digital story can review the collaborators' submissions via the submissions review module 1000. Submissions review video 1001 is a video preview screen that shows all visual aspects that were uploaded. It is understood that the submissions review video 1001 can display photographs, illustrations, video, and other visual material for review. Collaborator detail 1002 provides detail related to the contributor. That detail can include, addresses, contact information, background details, or various other information related to the contributor that is set in the system.

Collaborator detail 1002 may also include experience level 1003. Experience level 1003, which can be included in or separate from contributor detail 1002, shows the level of experience associated with a contributor.

Collaborator rank 1004 can be included to illustrate the rank given to a particular collaborator. The rank may be given by the user or a third party. The user may work with a third party to develop the rank. By way of example, if there were 40 people who tried out for one character role, each would be given a rank. The person with rank 1 may be given the role. If that person declined to take the role, the person with the second rank may be given the role, and so on. Collaborator rank 1004 can be determined by the use of selection module 1005, which can be used to select the correct people for a role. This can be accomplished in a variety of ways. One example is to include buttons that accept, reject, or hold a particular submission. By clicking accept, the user has determined that the collaborator is better than all others and moves that collaborator to a rank of 1. If the user does not like the collaborator, the user may reject the collaborator and that collaborator's rank will fall to the bottom. If the user is using this form of ranking, all that are rejected are given the same rank below others that have been accepted or that have not been reviewed. The user may place a hold on a collaborator when the user desires more time or more information on that user. This is one example of ranking collaborators. Another form of ranking is to review the collaborators and input the ranking. Ranking list 1006 lists all collaborators according to their roles. This input may be altered by the user to adjust the rank. In this example, adjusting the rank in the ranking list 1006 changes the collaborator rank 1004 as set forth in the collaborator submissions review module 1000.

Collaborator submissions count 1007 is a count that shows the number of total collaboration submissions and the status of review. Collaborator submissions count 1007 can randomize the submissions so that the user, when reviewing, is not looking at submissions only in a chronological manner.

Figure 11:
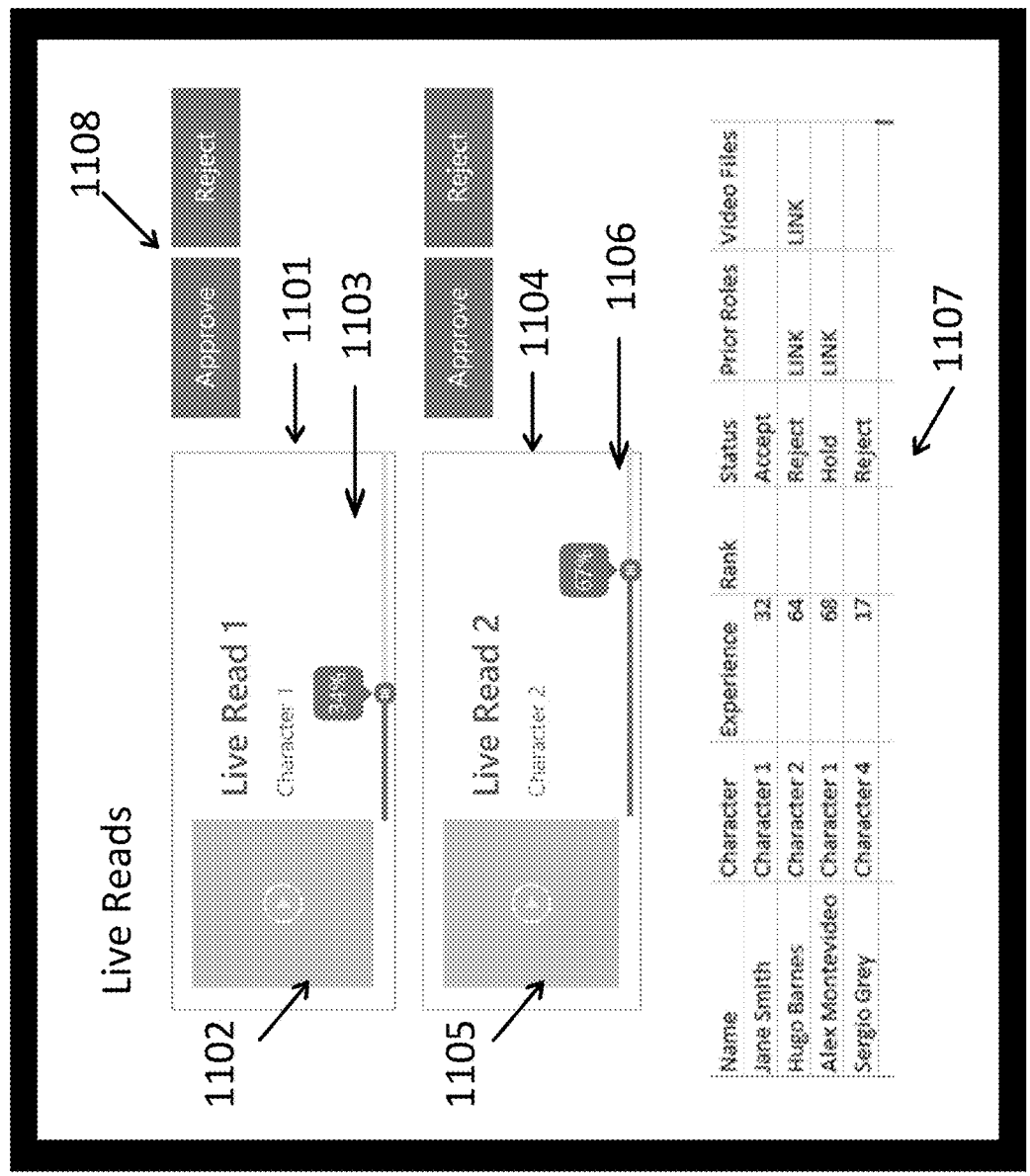
FIG. 11 shows example live reads module.

FIG. 11 shows example live reads module 1100. Live reads module 1100 can be used in connection with digital story application 104 or as a separate application that is connected to digital story application 104. Live reads module 1100 can use the same connectivity described in connection with digital story application 104 and may be used in connection with device 102, device 108, or another device. Live reads module 1100 enables the user U, described in FIG. 1, to control collaboration of the digital story.

Live read module 1100 can be used to collaborate on the development of the digital story. Live read 1 module 1101 can be connected to a collaborator who desires the role as, in this example, character 1. Live read video module 1102 can be used to stream or deliver video of a person auditioning for character 1. Live reads module 1100 can be connected to a third party viewing source that allows third parties to rank the read. Live read rank module 1103 shows the audience acceptance rate associated with the live read. This number can be expressed in a variety of ways, and is not required to be a percent. In the example of a percent, viewers are able to submit their ranking. The viewers rankings are then calculated and the percentage is a calculation based on the ranking given to the collaborator reading character 1.

Live read 2 module 1104 can be used to stream or deliver video of a person auditioning for, in this example, character 2. Live read video module 1105 can be used to stream or deliver video of a person auditioning for character 2. Live read rank module 1106 shows the collaborator rank based on audience participation of the live read. Another example of live read rank module 1106 is that it is controlled by the user who started the digital story and the user can shift the rank based on the performance. There are other ways in which the rank can be input into the live read rank module 1106.

Ranking list 1107 lists all collaborators according to their roles. This input may be altered by the user to adjust the rank. In this example, Jane Smith is reading Character 1 live while Hugo Barnes is reading Character 2 live. Ranking list 1107 includes the character that each person is auditioning for, the collaborator's experience level, the rank of that person, the current status of that person for the role, a link to prior roles, and a link to video files of the collaborator. Various other fields can be included in ranking list 1107. The ranking may be adjusted within ranking list 1107, which will modify the rank in other areas of the system.

Quick Buttons 1108 can be used to select or reject a collaborator that is taking part in a live read. Quick Buttons 1108 can, by way of example, be "Approve" and "Reject". These buttons can be modified to fit user needs. These buttons can be made available to third party reviewers of the live read. One way they can be made available is via social media. Another way they can be made available is via a website. Another way they can be made available is via the digital story application. They can be made available in various other ways. The buttons, in a variety of forms, can be set up to calculate the approval rating of the collaborator. Thus, if there were 100 viewers of the live reading and 34 people approved and 66 people disapproved, the approval rating for the live reader would be 34 percent, as shown in live read rank module 1103. In another example, if there were 100 viewers of the live reading and 67 voted to approve and 33 voted to reject, the collaborator live reader would receive a 67 percent as shown in live read rank module 1106.

The live read 1 module 1101 and live read 2 module 1104 are examples of live read modules for exemplary characters. A system can be set up with a single live read module or more than one. There is no particular number to limit. The live read modules can allow for the reading of a single character or multiple characters. The reading can be separate or simultaneous. By way of example, a relatively unknown collaborator may perform a live read for character 1 and a famous actor such as Samuel L. Jackson may perform a live read for character 2. The relatively unknown collaborator and Samuel L. Jackson will be linked via the digital story application and perform their character reads together.

The live reads module 1100 can record live reads and can also upload prior collaborations from the system, including the database, via the network, or other connected device. In this manner, a prior submitted recording can be played simultaneously with a live reading. Using the Samuel L. Jackson scenario above, Samuel L. Jackson could record one session. Other collaborators could then read along with the recording via the live reads module 1100. In this circumstance, the ranking system of Samuel L. Jackson could be removed and only the other collaborators would be reviewed. All recordings can be stored for future use via the database, cloud-based storage, or other device.

Figure 12:
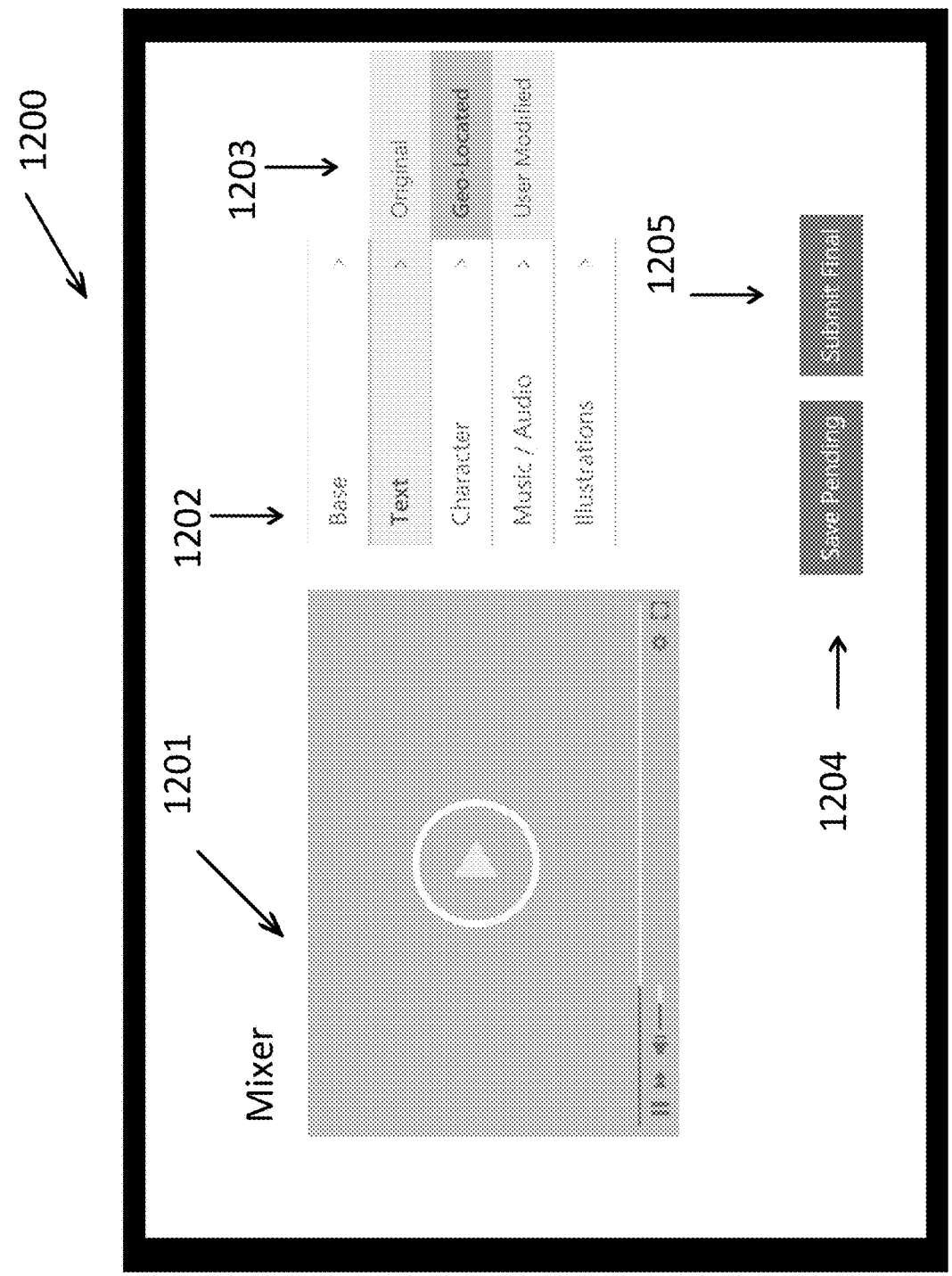
FIG. 12 shows an example mixing module.

FIG. 12 is an example mixing module. Mixing module 1200 enables the user to take collaborations of multiple collaborators and mix them into new work. Mixing module 1200 can be used in connection with digital story application 104 or as a separate application that is connected to digital story application 104. Mixing module 1200 can use the same connectivity described in connection with digital story application 104 and may be used in connection with device 102, device 108, or another device. Mixing module 1200 enables the user U, described in FIG. 1, to control collaboration of the digital story.

Mixer video 1201 is a video display that shows all video and visual elements that were uploaded into the system. Sound can also play via mixer video 1201. Collaboration selector 1202 can be used to select the elements that will be used in the digital story. By way of example, the base may be a text of a children's book story that had no illustration, no sound effects, no character readings, and no graphics when it was uploaded. The user opted to allow collaboration for the character reading, the music/audio, and the illustrations. Collaboration selector 1202 enables the user to review each collaboration input and select the one or ones that are desired. As stated, the base in this example is the text of a children's book story. The author can opt to modify the text and create different versions of the text. Sub-collaboration selector 1203 lists three examples of text: original, geo-located, or user modified. Sub-collaboration selector 1203 is meant to illustrate that each of the items may have sub-components that fit the needs of individual users. In these examples, the original is the text that was originally submitted into the system. The geo-located is text that has coding input in connection with items that may differ based on geographic location. For example, if the story was originally based in Chicago and referred to Chicago-style pizza, the geo-location selection may change that portion of the story to New York style pizza for readers who are reading the story in New York. The author can control what aspects of the text may be geo-located. The user modified selection will enable third party users to modify the text. For example, if the text originally was written with the protagonist's name as Susan, but a child's name to whom the book will be read was Sarah, the book can be modified by the end user (another collaborator) to use the name Sarah. With user modified selected, endless potential for variation of story is available.

Save pending button 1204 can save a pending work. By saving the work, for example, the user can leave the work, and come back to it at a later time without losing progress. The work can be saved in a pending state via the digital story application system in the database, in the cloud, or other networked environment. The user can come back and resume mixing the collaborative components of the digital story. When the user is complete, the user can select Submit Final button 1205 and save the file for publication. In one example, submitting the digital story via the Submit Final button 1205 will publish the work for viewing by third parties per the user's selection criteria. In another example, the digital story will be saved in a queue and the user will opt to publish at a particular date. It is understood that the user may come back to the digital story that has been submitted as final and make edits. In one example, the edited book will remain the same file and all versions will be edited. In another example, the edited book will not change a prior saved final book and will become a second edition. As the books are saved multiple times, new editions will be created. This is similarly the case if a collaborator started to create revisions to an already published digital story. In this sense, a wide range of new collaboration can be created using the system.

FIG. 13 shows example method 1300 for generating a digital story. Example method 1300 includes digitizing content (operation 1301), storing content (operation 1302), selecting levels of collaboration (operation 1303), storing settings (operation 1304), publishing content that is available for collaboration (operation 1305), contributing to the content (operation 1306), storing collaborator content (operation 1307), selecting collaborator content for inclusion (operation 1308), optional re-publication for additional collaboration (operation 1309), re-publishing collaborative content for additional collaboration (operation 1310), contributing to the content (operation 1311), selection of collaborator content for inclusion (operation 1312), saving content with collaborator content (operation 1313), mixing content with collaborator contributions (operation 1314), making available for viewing collaborator contributions (operation 1315), publishing collaborator contributions (operation 1316), sharing content with collaborator contributions (operation 1317), monetization for collaborative content (operation 1318), and saving new editions of the collaborative content (operation 1319). Although example method 1300 is described in terms of collaborating to modify existing content, it will be appreciated that various principles and operations described below regarding example method 1300 can be applied to generating a new content. Other embodiments can include more or fewer operations.

Example method 1300 begins by digitizing content (operation 1301). The digitation of content can come in multiple forms including taking a digital photograph, video, audio, or audio/video, scanning or electronically digitizing a photo, card, paper, or other media, or other forms of making content digital.

Another step of example method 1300 is storing content (operation 1302). Storing content (operation 1302) includes uploading content into an environment that can be linked to the digital story application. The content can then be stored on a server located in the digital story application environment, in a cloud storage device, in a local storage device, or in any other storage device that can be linked to the digital story application.

Another step of example method 1300 is selecting levels of collaboration (operation 1303). A user who digitized content, uploaded that content to the digital story application environment, and saved the initial content can select whether the content is available for collaboration with a collaborator or collaborators. If the user chooses to allow collaboration, the user can also choose the level of collaboration, including who may collaborate. A user can select a single collaborator to assist. For example, an author user who uploaded a children's book may select a known children's book illustrator to collaborate, but not allow other parties to collaborate. A user can also select a class of collaborators to contribute. By way of example, the author user may only select collaborators with a rank score of above 50 to contribute to the digital story. Various other selection criteria can be used to narrow the collaborators who may be permitted to collaborate on the digital story with the initial user. The user may also select what types of collaboration are available, which may, for example, include character reading, audio and sound effects, text, and illustration. It is understood that other collaboration may be available, including a musical score or a medical record review.

In a musical score environment example, a composer may upload a draft score that includes three instruments, including the violin, cello, and flute. The composer user may turn on collaboration in the system in order to bring in collaborator composers to assist in the development of the score. In the selecting levels of collaboration (operation 1303) stage, the user can select specific collaborators or allow open collaboration. In this example, the composer user may select one collaborator composer to add a French horn instrument composition to the score. The composer user may select a second collaborator to add the bass and oboe lines to the composition. The composer user can also open up the collaboration to all users, in which case all users will be permitted to submit collaborative content.

In a medical record review setting example, a physician user can upload a patient record into the digital story environment in relation to a patient with a hard-to-diagnose ailment. The physician user can then select a group of collaborators to review the patient record and add to the patient record based on the other professionals' expertise. Alternatively, the physician user can open the patient record up to a larger group of physicians. The selecting levels of collaboration (operation 1303) stage can include criteria that the collaborators must meet prior to being able to be selected. In the medical record review setting, for example, a patient record may only be available to a single clinic setting or it may be only available to a group of physician who share a system. It is understood that the collaboration features can be modified to fit the needs of the users depending on the situations. Patient consent features can also be incorporated into the collaboration step to prevent opening the medical record to those who are not permitted to see the record. These features can be used in more than the medical review environment.

Another step of example method 1300 is storing settings (operation 1304). The collaboration settings selected by the user can be stored in the digital story application environment in a server, cloud based storage system, local storage, or other storage system that can be linked to the digital story application system. The settings may be modified by the user and then stored again for future use.

Another step of example method 1300 is publishing content that is available for collaboration (operation 1305). A user who has uploaded content and selected to collaborate with other users may publish the user's content on the digital story application environment or other means such as via social media, a website, or other mechanism. The selected content can then be accessed by others.

Another step of example method 1300 is contributing to the content (operation 1306). Once the content is made available for collaboration, the collaborators may contribute to the content. Examples include: An illustrator can provide illustrations to a text story that an author user uploaded to the digital story application. A composer can provide a score for an instrument that another composer user uploaded. A physician can provide updates to a medical file based on a review of x-rays that another physician user uploaded. An author can work with other authors to create a shared story when the collaborators contribute to the initial content uploaded by the initial user. A musician can work with other musicians to create a joint work by placing an audio track as content in the digital story application environment and having other collaborators contribute different musical tracks of various instruments to the overall piece. Composer collaborators can upload rock ballad vocal and instrument tracks to a set of lyrics uploaded by a composer to create a collaborative musical work. Voice-over actor collaborators can contribute voice over character audio files to a movie script that a script writer user uploaded to the digital story application. A teacher can add comments to an essay that a student user uploaded to the digital story application. A book editor can provide commentary to a book script than an author uploaded to the digital story environment. A blog photographer can add photographs to a blog story that a blogger wrote. A vlogger can add video content and a voice-over actor can add audio content to a script written by a blogger user. A coach can provide audio voice-over comments to a video of an athletic game uploaded by a player user. These are mere examples of the collaborator contributions to the content under operation 1306. The contribution to the content can be any digital file that can be uploaded to the digital story application.

Another step of example method 1300 is storing collaborator content (operation 1307). The contributor content described in connection with operation 1306 can be stored in the digital story application on a server, a cloud storage system linked to the digital story application, a local drive, or any other storage medium that is linked to the digital story application. The stored collaborator content can be accessed by users with permissions to access the content, which may include the original user that uploaded the initial content or collaborators who contributed to the content. It is understood that restrictions may be placed on access to content, including limiting access to only files uploaded by a particular contributor. The digital story application can track the user contributions and access to content. The original user who contributed the initial content can set the collaboration criteria and also set storage and access permissions. Storage and access permissions may also be controlled by an administrator or others with permissions to control access and storage rights. An administrator can also have full access rights to view, edit, and remove any content added to the system.

Another step of example method 1300 is selecting collaborator content for inclusion (operation 1308). Once collaborator content is stored in the digital story application, the user who uploaded the original content (or another with permission rights to the original content) can access the collaborator content and determine what will be included in the digital story. For example, a user may upload a text story and permit collaborators to contribute to the character voice-overs, to add illustrations to the text story, to add cover art, and to add sound effects. I this example, 43 collaborators contributed to character voice-overs, 56 collaborators contributed to illustrations, 1 collaborator provided cover art, and 157 collaborators added sound effects. The user may review each of the collaborators works and determine which will be added to the digital story. The user may also mix the collaborators works so that the voice-over fits together with added sound effects. For example, if collaborator number 15 on voice-over was phenomenal, the user could select the voice-over from collaborator number 15 and disregard all other collaborators on voice-overs. The user could also add voice-overs from collaborator number 15 and 17 because they performed different characters and the user preferred those voice-overs. The user can also select collaborator 132 on sound effects because the sound effects matched the voice-over of collaborator number 15.

Each collaborator can be given an account number or an account name, similar to a screen name that can be used to distinguish the collaborators. A collaborator who contributed multiple content (e.g., voice-over and illustration) can be highlighted to the user. The order of the collaborators can be arranged according to the desires of the user. For example, the user can rank the collaborators in order of rank. The user can order the collaborators in rank of monetization earnings. Other variations are available for ranking the collaborators such that the user can more quickly select collaborators that are desired. The user may alternatively permit all collaborative content to be available for publication. In this case, the user is making the content available to the public for consumption and additional collaboration. One example of this is when a user wants to contribute a work to the public domain and allows collaborators the right to contribute to that work.

Parties other than the user can be provided permissions to select collaborator content. By way of example, a user may permit an editor or publisher to have rights to select content. An administrator may be given permissions to select content. Another example is to give other users (or the public, for example via social media) the permission to vote on collaborative content to be included in the digital story. In this example, users can be given options of, for example 5 collaborative character voice-overs for use in the digital story. Each may be made available to other users to view and vote on. This can be used from a marketing perspective to judge which character voice-overs perform better in certain segments versus others. Selection of the voice-over collaborators can be based on the rankings of the individuals who viewed and voted on the collaborative content. This selection process of permitting samples to be viewed by the public can provide marketers, publishers, and the user insights into what content is more popular.

Demographic information can be collected from the individuals who are providing votes or ranks associated with the content. For example, if 500 users ranked collaborative content for a digital story and individuals from New York preferred collaborator number 115 and individuals from California preferred collaborator number 10 for character 1, the user may opt to have two variations of the digital story and make one version available for East Coast viewers and make another version available for West Coast viewers. The East Coast version may have collaborator number 115 and the West Coast version would have collaborator number 10 read for character 1. Users may opt to create additional versions based on reviews of the submitted collaborative content.

Another step of example method 1300 is optional re-publication for additional collaboration (operation 1309). A user who uploaded content that received additional collaborative contributions can opt in to re-publish the work for additional collaboration. The user may select an option to re-publish the work, which will make it available to other collaborators.

Another step of example method 1300 is re-publishing collaborative content for additional collaboration (operation 1310). After the user opts into re-publication, the user can re-publish the work for additional collaboration. For example, an author user who submitted a text of a children's book story can initially only select collaboration for the cover art. After the cover art is selected, the author user can re-publish the content in the digital story application for additional collaboration. For instance, the author user can make collaboration available for illustration. The author user can then process the prior steps and select a collaborator or collaborators for the illustration and then re-publish the content (now including text, cover art, and illustration) for collaboration in connection with the character. Collaborators can live read for roles associated with the character or characters in the story to add a voice-over track of the characters.

Another step of example method 1300 is contributing to the content (operation 1311). Once the user opts into re-publication of the content (with collaborative contributions included) and re-publishes the content, collaborators can add additional collaborative content.

Another step of example method 1300 is selection of collaborator content for inclusion (operation 1312). The user can review and select collaborator content for use in connection with the digital story.

Another step of example method 1300 is saving content with collaborator content (operation 1313). Once the collaborative content is uploaded or contributed to the system, the content can be saved or stored in the digital story application via a server, cloud based environment, local storage linked to the digital story application or another storage device liked to the digital story application. The content can then be accessed by those with permissions to access the content.

Another step of example method 1300 is mixing content with collaborator contributions (operation 1314). The user can mix the collaborative content by selecting the collaborative content that is desired for the digital story. By way of example, a user may select one collaborator for character 1, another collaborator for character 2, and another collaborator for character 3. The user can then mix the voice-over collaborative content so that the lines from character one come from the first collaborator, the lines for character 2 come from the second collaborator and the lines for character 3 come from the third collaborator. The user may also select sound effects from a collaborator and mix those sound effects into the voice-over read from the character collaborator. By mixing the digital files uploaded by the collaborators, the user can create a new work that contains the user's initial contributions and collaborative contributions from other users.

Another step of example method 1300 is making available for viewing collaborator contributions (operation 1315). The user can make the collaborative content available for viewing by others. This can be accomplished by, for example, saving the mixed version that includes the user's initial content mixed with collaborative content to the system and opting to have the version made public (available for viewing by others, which may be based on permissions in and out of the system).

Another step of example method 1300 is publishing collaborator contributions (operation 1316). Once the user opts to make the collaborative content available for publication, the system can publish the content. Publishing can be made to a select group of viewers (for example editors or publishers who have paid access rights to see content), to the public via the digital story application, or via other means that can show the collaborative content.

Another step of example method 1300 is sharing content with collaborator contributions (operation 1317). The user or other with permissions can also share the collaborative content. For example, the content can be shared via social media application, via email, text, or other means for sharing the content. Other applications for sharing the content include use of sharing a link that directs recipients to view a stored version of the content.

The system can track the outbound shares and track the number of times the content has been viewed using industry standard tracking mechanisms. This information, like the demographic information, can be used to determine what version of the collaborative content is best suited for particular audiences. A graphical user interface can be used to track demographic and user information to select which version of the collaborative content will be more popular. Users can publish multiple versions of the collaborative content, learn from the publishing, and then determine which versions are liked more. Users can then remove versions that are not liked or put more money into advertising the versions that trend well. Surveys can be included in connection with the publication of the collaborative content that can also provide detail related to the content.

Another step of example method 1300 is monetization for collaborative content (operation 1318). A user can monetize content that is uploaded to the digital story application. The digital story application tracks the contributions to the digital story and provides contribution units for collaboration. For example, an author user uploads a children's story text to the digital story application and opts to have collaboration in connection with the illustration. The author user selects one illustrator collaborator to complete the illustrations. The total contributions to the collaborative content equal 100, with units given to each piece of collaboration. In this example, 50 units are given to the text and 50 units are given to the illustration.

The weights of the contributions can be set by the administrator, or the user, or another with permission to set the weights. For example, a user who desired collaboration in connection with character voice-overs, background music, sound effects, and illustration for a text story that the user uploaded to the digital story, the user could set the weights as follows using a 100 point scale: 50 points for the text, 5 points for each of 3 character voice-overs, 10 points for the background music, 5 points for sound effects, and 20 points for the illustration. The monetization scale is available to the collaborators before the collaborators provide their contributions so that they will know what percent of total revenue they will receive upon collaboration. If the digital story, including the original content and the collaborative content, was monetized and received $1,000, $500 would go to the user for the text, each character voice-over would receive $50, the collaborator on the background music would receive $100, the sound effects collaborator would receive $50, and the illustration collaborator would receive $200. In another example, the administrator of the digital story obtains 10 percent of all monetization. Using the example of $1,000 monetization, the digital story administrator would receive $100 and then $450 would go to the user for the text, each character voice-over would receive $45, the collaborator on the background music would receive $90, the sound effects collaborator would receive $45, and the illustration collaborator would receive $180.

Monetization of the digital stories can come in multiple forms, including advertisements shown in connection with the digital stories, user subscription fees, purchase agreements for rights to the digital stories, non-fungible token marketplace placements and sales, and various other forms of monetization of digital content. By way of example, a user uploads a text complete with illustrations and collaborates with a character voice-over collaborator and a sound effects collaborator. The user sets monetization at 50/30/20 for the text illustration/character voice-over/sound effects. The user selects one collaborator who contributed the voice-over collaborative content and one collaborator who contributed the sound effects content. The user published the digital story via the digital story application and 1,000,000 users view the digital story with a 0.35 percent click through rate, resulting in 3,500 click-throughs. With each view, a 5 second ad was presented to the viewer before the digital story. The average price for each click-through was $1. The ads are geo-targeted, meaning the ads displayed in New York were for New York advertisers and the ads displayed in California were for California advertisers. The user also opted to have geo-located content, meaning that certain portions of the digital story changed based on the geographic location of the device where the digital story was played. For example, if the original story discussed a Chicago pizzeria, the geo-location would modify the name of the pizzeria on devices playing the digital story in New York to a pizzeria that was geographically close by. That pizzeria paid for an advertisement to be placed in the digital story. The placement was $2.50 per view and viewers in New York that triggered the geo-located ad viewed the placement advertisement 100 times. In this example, the user and collaborators receive monetization for the 3,500 click-throughs at $1 a piece ($3,500) and $250 for the geo-located advertisements for a total of $3,750. Assuming that the administrator of the digital story application received 50 percent of the revenue ($1,875), the user and collaborators would make $937.50 for the text illustration, $562.50 for the character voice-over and $375 for the sound effects. The foregoing is one monetization option for the digital story application. Other monetization methods are available for use in connection with the digital story application.

Collaborators may also create versions of the digital story and make additional versions of that digital story. The digital story application tracks the collaboration of content, including the content that was originally added before the collaborator created a new version. The collaboration tracking carries with the content so that the original contributors will receive the monetization for their contributions. The digital story application has copyright and plagiarism control systems in place to monitor text, audio, photo, and other files to verify that the content, when loaded, is new and was not subject to a prior contribution by another user or collaborator. If the content matches a prior user's contribution, the digital story application will reject the content. In another example, the digital story application will permit the inclusion of the content, but will provide the original contributor units of contribution and will remove the contributor units from the second collaborator. In this example, the digital story application tracks the content priority and provides contribution credit to the prior collaborator. The copyright and plagiarism control system can also perform Internet searches and track content that was previously published on the Internet outside of the digital story application. The digital story application can reject content that was previously published outside of the digital story application or place restrictions on the content. The digital story application can also require affirmation by the user or collaborator that the content is owned by the user or collaborator and is not subject to any ownership rights of any third party. If the attestation is not made, the content may be rejected and the user or collaborator attempting to upload the contribution will receive no monetization.

Another step of example method 1300 is saving new editions of the collaborative content (operation 1319). A user can save multiple editions or variations of collaborative content in the digital story application. A user may select one edition to have a single character voice-over for three characters in a digital story and a second edition to have three voice-overs for each of the three characters in a digital story. The digital story application can place limits on the number of collaborative editions that are available. A warning notification can be sent to the user if the collaborative editions are approaching the limit. The user can then purge version that are not ranking or trending well based on the demographic, geographic, and other tracking data associated with each digital story.

One example of saving editions or variations of collaborative content is to save an edition or variation as a non-fungible token ("NFT"). This can occur when the digital story is minted as an NFT on the blockchain. The digital story saved as an NFT can be validated on the blockchain and ownership of the NFT can be passed from one owner to another. The digital story saved as an NFT can also be deployed in a metaverse environment where it can be viewed by others in that environment.

FIG. 13A further shows another example method 1300A for generating a digital story in a blockchain environment. Example method 1300A includes the operations of example method 1300 from FIG. 13 and adds uploading content on the blockchain (operation 1320), executing smart contract protocols (operation 1321), scheduling royalties from subsequent sales (operation 1322), associating a digital wallet (operation 1323), making content available in a marketplace (operation 1324), making content available for sale (operation 1325), selecting contribution levels (operation 1326), contributing to the content (operation 1327), minting collaborative content (operation 1328), monetizing collaborative content (operation 1329), and associating the collaborative content with a metaverse (operation 1330).

Although example method 1300A is described in terms of collaborating to modify existing content, it will be appreciated that various principles and operations described below regarding example method 1300A can be applied to generating a new content. Other embodiments can include more or fewer operations or in different order.

Steps of example method 1300A can include the steps set forth in example method 1300. Another step of example method 1300A is uploading content to the blockchain (operation 1320). One way to do so is to mint content. Minting is the process of turning a digital file into a digital asset on the blockchain. A common blockchain used in connection with minting NFTs is the Ethereum blockchain. Other examples of blockchains to mint NFTs include Polygon, Solana, Flow, Cardano, Immutable X, Tezos, and Wakatta. It is understood that there are other blockchains to mint an NFT. It is further understood there are layer 1 blockchains (e.g., Ethereum) and layer 2 blockchains (e.g., Polygon). Other layers can exist or be built on existing layers. The digital asset is stored in the blockchain, which is a decentralized database or distributed ledger and associated with a smart contract.

The digital asset can be a photograph, image, audio or music file, plain text file, 3D model, online game item, virtual property, virtual world, metaverse, domain name, or other digital file. An NFT may relate to a digital file or an in real life object that is represented with a digital file.

Another step of method 1300A is executing at least one smart contract protocol (operation 1321). There are several token standards used in connection with NFTs. Examples on the Ethereum blockchain include ERC-721 and ERC-1155. The ERC-1155 standard allows for the creation of fungible and non-fungible tokens.

When an NFT is created, metadata is also associated with the token. Metadata can include the creator or artist information, a description of the digital file, the price, the date when the file was created, ownership detail, royalty information, transaction history detail, ownership detail, license details, link locations of the art. Other metadata can be included. The token is a code that is associated with the art. The art can be saved in various locations, including on a decentralized interplanetary file system server.

Another step of method 1300A is scheduling royalties from subsequent sales (operation 1322). The smart contract associated with the NFT can include metadata that schedules royalties for subsequent sales. An NFT creator can select, for example, a royalty rate of 5 percent for subsequent sales. Upon doing so, if the NFT were sold for the first time, the creator could get the sale price, minus any marketplace charges, if applicable. If the NFT were to sell a second or subsequent time, the creator would get a 5 percent royalty for each sale.

Another step of method 1300A is associating a digital wallet (operation 1323). A digital wallet stores cryptocurrency and digital assets, such as NFTs. Examples of digital wallets are Metamask, Trust Wallet, and Coinbase Wallet. Digital wallets include a public wallet address as well as a private key. The public wallet address can be used to transfer cryptocurrency or NFTs from one wallet to another. The private key acts like a password. The digital wallet can be used to fund the minting process, which can include a gas fee or Gwei. The public wallet address can be used to associate with the royalties set forth in operation 1322.

Another step of method 1300A is making content available in a blockchain marketplace (operation 1324). This step can include connecting the digital wallet of operation 1323 to an NFT marketplace. Examples of NFT marketplaces include OpenSea, Rarible, and SuperRare. There are numerous other marketplaces. Once a user's digital wallet is connected to the marketplace, digital files can be uploaded to the marketplace. Files generally accepted can include JPG, PNG, GIF, MP3, MP4, GLB, and WAV files, among others. This digital content can be uploaded to the NFT marketplace as a single file or as multiple files.

The more files that are uploaded, the more content will be available for collaboration. Multiple users may upload files in the manner described. Files can be uploaded to a single account or multiple accounts. The collaboration system can be accessed by one or more collaborators to create a digital story that can be made into an NFT.

Another step of method 1300A is making content available for sale (operation 1325). Once the content in the form of digital file or digital files are uploaded to the marketplace, the content can be made available for sale as an NFT. The content can be sold in its individual parts or can be combined to make a unique or derivative work. The content can also be made available on a collaborative system that permits a user or more than one user to create a digital story using the files that user uploaded or files that another user uploaded.

Another step of method 1300A is selecting collaboration levels (operation 1326). The original user that uploaded digital files can select the levels of users who are allowed to collaborate. One form of selecting collaboration levels is to toggle whether collaboration is available or it is not. Another form of selecting collaboration levels is to select the type of collaboration that is available. For example, the original user who may have uploaded a text story may only want to allow collaboration to occur for sound files, for example in the form of a voiceover. In another example, the original user may only want to allow collaboration in connection with visual art, for example in the form of illustrations to the text story.

Another step of method 1300A is contributing to the content (operation 1327). Collaborators can add additional digital files to the digital story. This can be accomplished by uploading digital files as described herein. Collaborators can then connect those files with other uploaded files. Using the digital story editing system described herein, collaborators can access files on the file share system and mix the files to create a new digital story based on the uploaded content and collaborators' created content on the system. In the blockchain context, collaborators can use content that is on blockchain and can also use content that is not yet on the blockchain to create collaborative content.

By way of example, a collaborator can take a digital file that is an illustration and add text to the illustration. By way of another example, a collaborator can take a text file of a story and add a digital voiceover of the story and add illustrations to go with the text. Each additional collaborative content can be added to create a collaborative digital file. Contributions to the content can also occur real time. For example, two collaborators can access a text story and create a two-person voiceover. One or more than one collaborator can collaborate to create a new digital story. The collaboration can also take place in the metaverse. By example, digital files can be uploaded to the metaverse. Collaborators can access the digital files and create new content. Collaboration can occur with multiple collaborators using avatars or other features to interact with each other while collaborating on building a collaborative digital story.

Another step of method 1300A is minting collaborative content (operation 1328). A new version of the digital story can be minted into an NFT. That NFT can be associated with a smart contract and can be sold via a marketplace. The smart contract can have one or more action steps including setting royalties, setting burn functions, setting license terms, and enacting self-executing and self-verifying terms.

Another step of method 1300A is monetization for collaborative content (operation 1329). The collaborative content can be monetized in multiple ways, including charging for the initial sale price, inputting a royalty into a smart contract associated with the NFT, and licensing the NFT. Other examples of monetization include a shared revenue stream with a licensor of content that is used to create a digital story. Monetization can also be based on derivative works. An initial collaborator can receive a revenue stream based on works that are created as derivatives of the original work. There can be multiple collaborative works created from original content. Each of those collaborative works can be monetized by the original creator via revenue sharing.

Another step of methods 1300A is associating the collaborative content with a metaverse (operation 1330). Digital content that is minted into an NFT can be associated with a metaverse or metaverse environment. For example, a collaborative digital story can be minted into an NFT as a video and that NFT video can be uploaded to a metaverse environment for viewing in the metaverse. Users who access the metaverse can view the digital story in metaverse.

Figure 14:
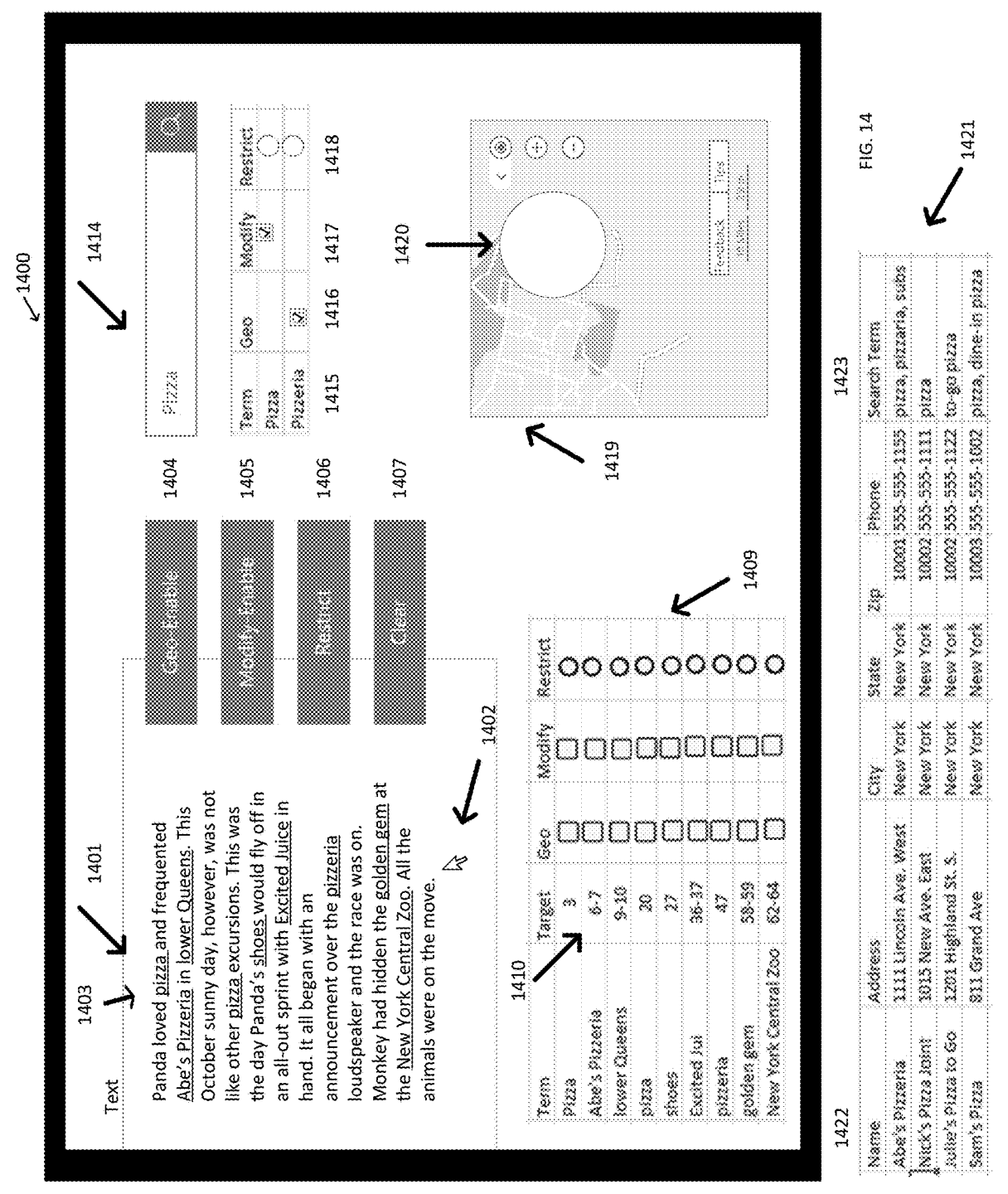

FIG. 14 shows example geo-location module 1400. Geo-location module 1400 can modify content of a digital story based on the geographical location of the device on which a user is viewing the digital story. Digital story content 1401 is an example of content that is part of a digital story. In the example, the content is text, but can be any digitized content, including lyrics, audio files, photographs, illustrations, and video. The digital story content 1401 has a selection tool 1402 that can select a portion of the digital story content 1401 and create call-out content 1403. The selection tool 1402 is a cursor selector, but take various forms so that content may be selected. Selection tool 1402 can click on a word or multiple words and activate the call-out content 1403. Call-out content 1403 is activated in the example with an underline, meaning that it is ready for an action. There can be various actions associated with the activated call-out content 1403. Example actions include geo-enable (action 1404), modify-enable (action 1405), restrict (action 1406), and clear (action 1407).

The modifications to content can be made available to collaborators, who may opt to provide content for different variations of content. For example, a character voice-over actor may prepare one version of content that includes the term "pizza" and another that includes the term "spaghetti". The different versions can be linked using a database. Similarly, sound effects, background music and other content elements can be created as variations of content, which can be mixed together.

Geo-enable 1404 is an action that enables the call-out content 1403 to be modified based on the geographic location of the user who is accessing the digital content via the digital story application or other viewing environment. Geo-enable 1404 can be activated for a single item of content or multiple items of content at a time. In the example digital story content 1401, the call-out content 1403 is text with multiple words selected. Another option would be to select a single term in a paragraph of text and take an action on that term and then move to the next term.

Modify-enable 1405 is an action that enables the call-out content 1403 to be modified based on user preferences that are not necessarily linked to a geography. For example, a user may want to permit viewers to modify the term "pizza" to "spaghetti". The user can activate the modify-enable 1405 action to enable such revision. The revision can also take place automatically based on user preferences and machine learning. If the call-out content 1403 was activated for modify-enable 1405, and the digital story application has user preferences of a user viewer that had done a recent search for spaghetti, the digital story can be modified to replace the term "pizza" with the term "spaghetti". An advertisement can also be associated with the modified term. For example, instead of stating "spaghetti", the modification may be Gabe's Italian spaghetti. A link can be associated with Gabe's Italian that will bring the user to a website or other online location for Gabe's Italian. The Geo-Enable 1404 and Modify-enable 1405 can be used separately or together in order to create various versions of a digital story.

Restrict 1406 action can be used to restrict certain terms from modification. If the author user who uploaded the digital content did not want any revisions to "Abe's Pizzeria", the user could select the term "Abe's Pizzeria" and activate the restrict function, which would restrict the term from being used in connection with geo-enable 1404 or modify-enable 1405. The clear 1407 action can be used to clear all selected terms.

In the example of call-out content 1403, the words "pizza", "Abe's Pizzeria", "lower Queens", "pizza", "shoes", Excited Juice", "pizzeria", "golden gem", and "New York Central Zoo" are called out. Upon selecting the geo-enable 1404 action, the call-out content 1403 references a database that contains content related to the term or terms. The digital story application can modify or replace a call-out content 1403 term when a match is available for that term. Artificial intelligence and natural language learning can be used to automatically identify terms that are a popular (referencing, search engine statistics, for example) so the user does not need to manually select the call-out content 1403.

Once the call-out content 1403 is activated with the geo-enable 1404 action, the call-out content is available for modification based on the geographic location of the user when viewing the digital story. A user can test the geo-enable 1404 action by using the geo-location map 1419 and the geography selection tool 1420. A user can increase or decrease the size of the geography selection tool 1420, which will increase or decrease the number of names located within a particular geography. For simplification, the only term referenced in this example is the term "pizza". The geography database 1421 includes four geo-identified names 1422 that are associated with the search term 1423 "pizza". The user can modify the geography selection tool 1420 to increase or decrease the size of the geographic location, which in turn will increase or decrease the number of geo-identified names 1422 that are located in that geographic area.

Upon activation of the geo-enable 1404 action, the call-out content 1403 that was subject to the geo-enable 1404 action can be modified based on additional content that is made available. By example, the term "pizza" is call-out content 1403. Upon activation of the geo-enable 1404 action, the term pizza can be referenced in search terms of the geography database 1421. The term "pizza" can then be modified or replaced based on the geo-identified name 1422 in the geography database 1421. In the example, the call out content 1403 "pizza" can be modified to "Abe's Pizzeria pizza" or "Abe's Pizzeria" so that the first line of the digital story content 1401 would read "Panda loved Abe's Pizzeria pizza . . . " or "Panda loved Abe's Pizzeria . . . ." It should be understood that the geo-identified names 1422 are not required to be a business name. Rather, the geo-identified names 1422 can be any term that was selected to be associated with a search term 1423. In the digital story application, a user viewing a digital story that had the geo-enable 1404 action activated, would Geo-search 1414 can be used to search digital story content 1401 for particular terms. Results of the geo-search 1414 include matching terms 1415. The geo-search can be used to select call-out content 1403 in a different format. In the example, the user input "Pizza" in the geo-search 1414 field, which return the matching terms 1415 "Pizza" and "Pizzeria". The digital story application has selection fields under the geo-enable field 1416, modify-enable field 1417, and restrict field 1418. These field may be selected for the terms, which will enable the Geo-Enable 1404 action for those terms.

As call-out content 1403 is selected, the call-out content 1403 can appear in a call-out content table 1409 so a user can review the call-out content 1403 in a list form. There may be more than one use of a single word—in the example there are two uses of the term "pizza". To distinguish between different terms, one example is to provide a numeric number to every word listed in a text (similar action can take place for non-text content), and identify the term with a unique number ID 1410. The unique number ID 1410 can be associated with a database that includes content items associated with unique number ID 1410.

FIG. 15 is an example of a database field set 1500 that provides a unique identification number for each item of content in a digital story. In the example provided in FIG. 15, the content is text. Each term 1501 is associated with a position 1502 that acts like an individual identification number. That identification number can be used to reference a particular word for modification as set forth in FIG. 14.

Figure 16:
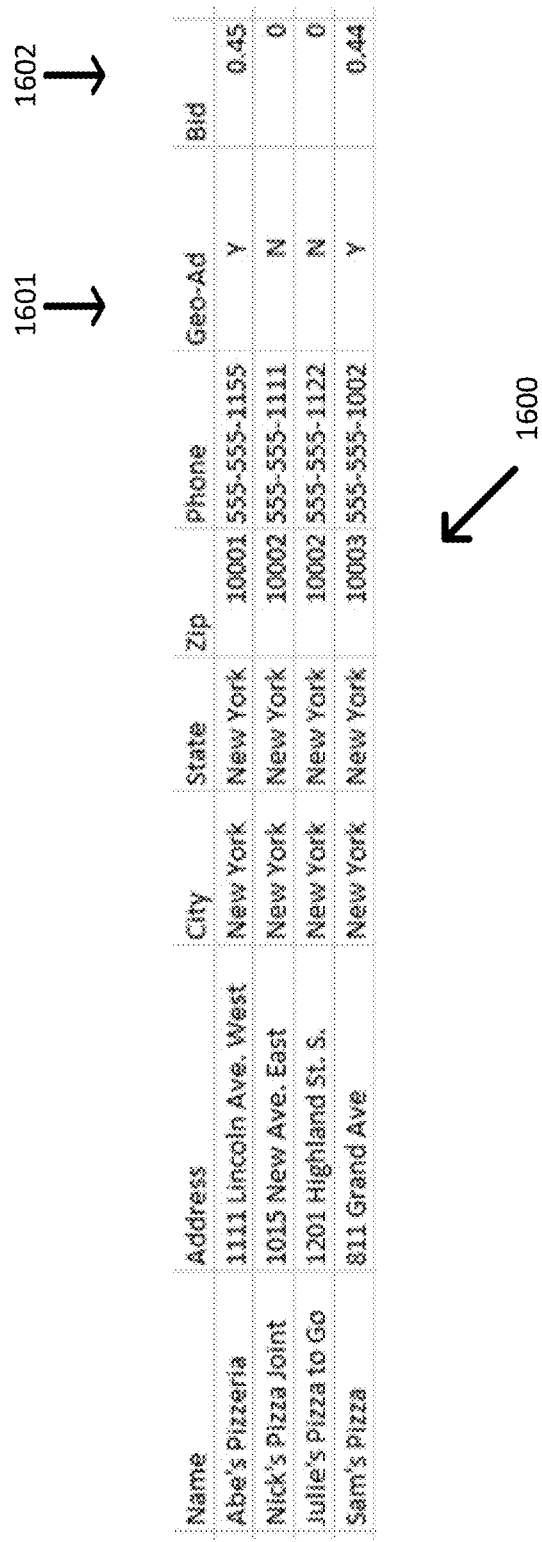
FIG. 16 shows an example database field set 1600 that is a directory of businesses by geographic location.

FIG. 16 is an example database field set 1600 that is a directory of businesses by geographic location. Geo-ad selection 1601 is a field that shows whether the name has opted into geographic ads. Bid 1602 is a field that shows the price the name is willing to pay to be selected for an advertisement shows in or connected to the digital story.

A monetization module can also be included in the digital story application. Users and collaborators who add content to the work can be provided contribution units. By example, 100 contribution units can be attributed to a version of a digital story. The user may receive all or a subset of the contribution units. Collaborators may receive contributions units. Upon monetization of a version of the digital story, a portion of the revenues will be distributed based on the contribution units.

Figure 17:
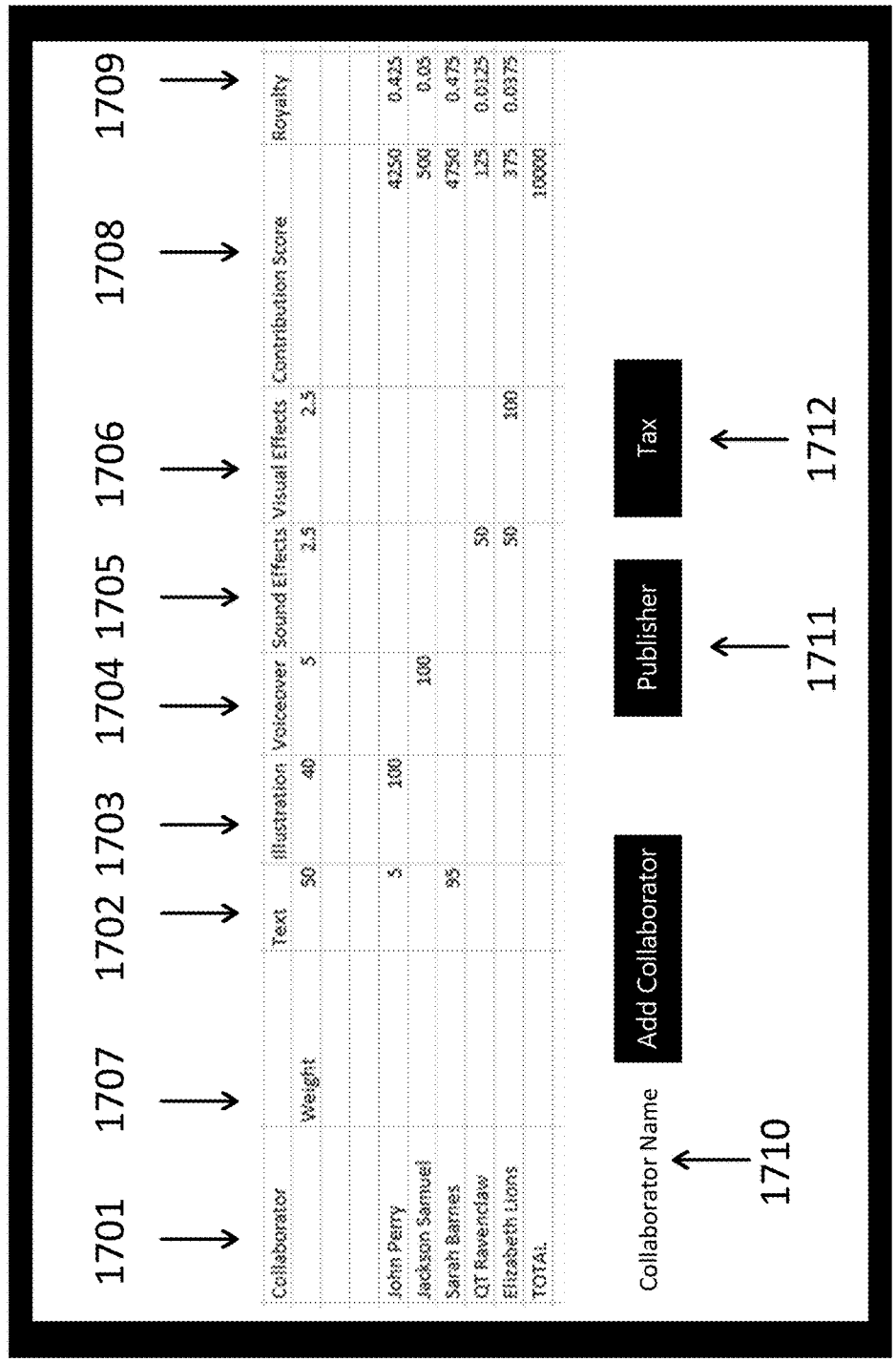
FIG. 17 shows an example monetization module that tracks contributions from collaborators.

FIG. 17 is an example monetization module 1700 that tracks the contributions from collaborators. A list of contributors 1701 are the collaborators for a digital story. A collaborator is added to the list when the collaborator contributes to the digital story. For example, the list of collaborators 1701 contains the names John Perry, Jackson Samuel, Sarah Barnes, QT Ravenclaw, and Elizabeth Lions. In one example of the monetization module, each name was added when that collaborator contributed to the digital story. There are different forms of collaboration including text 1702, illustration 1703, voiceover 1704, sound effects 1705, and visual effects 1706. The foregoing are illustrative only. Other types of content can be added to the system.

The different forms of collaboration can be given a weight 1707. The weight 1707 can be based on a pre-set weight or can be determined by one or more than one of the collaborators. A contribution score 1708 can be calculated based on the contribution percentage multiplied by the weight 1707. A royalty 1709 is determined based on the overall percentage of the contribution score 1708. The royalty 1709 can be referred to as contribution units. Collaborator names can also be added manually via the add collaborator feature 1710 in which the name of a collaborator is uploaded into the monetization module.

The percentages of contribution by each collaborator can be determined based on the amount of contributions made by each collaborator. The percentages can also be determined by the collaborators and then input into the system. In the example, the royalty 1709 adds up to 1 or 100 percent. Thus, if the digital story generated a revenue of $10,000, John Perry would get $4,250, Jackson Samuel would get $500, Sarah Barnes would get $4,750, QT Ravenclaw would get $125, and Elizabeth Lions would get $375. Additional features can be added to the monetization module including a publisher royalty feature 1711 and tax module 1712.

The publisher royalty feature 1711 can be used to input a percentage or fixed amount that will go to a publisher. A publisher in this sense can be any party who would be given a percentage of the revenues. The tax module 1712 can be used to subtract for taxes that may need to be paid. It is understood that other modules can be added to add or subtract revenue for different reasons.

Figure 18:
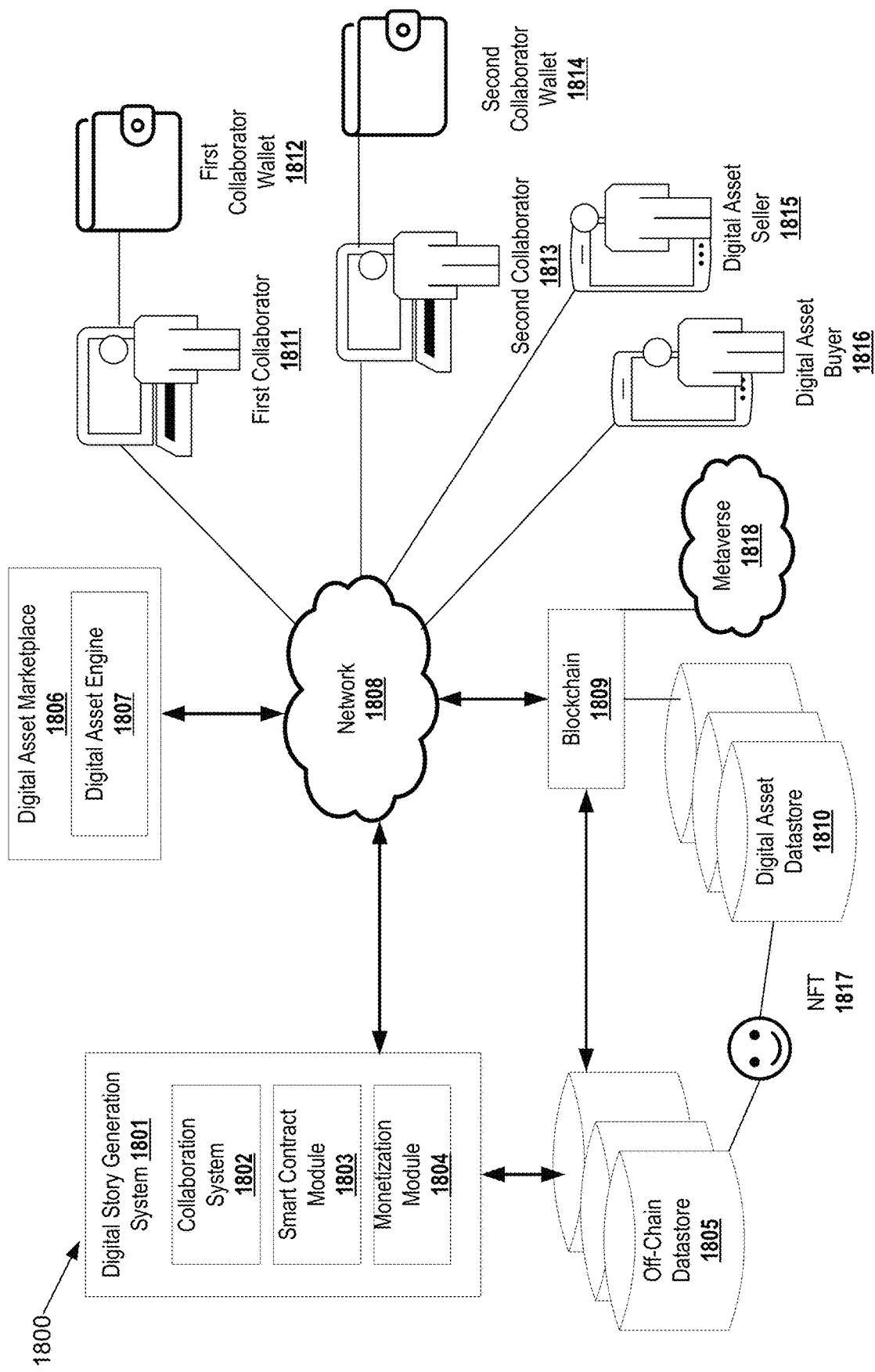
FIG. 18 shows another example environment of a digital story generation system.

FIG. 18 is an example environment 1800 of a digital story generation system 1801. The environment includes a collaboration system 1802, smart contract module 1803, and monetization module 1803, off-chain datastore 1805, a digital asset marketplace 1806 with a digital asset engine 1807, a network 1808, a blockchain 1809, a digital asset datastore 1810, a first collaborator 1811 with a first collaborator wallet 1812, a second collaborator 1813 with a second collaborator wallet 1814, a digital asset seller 1815, a digital asset buyer 1816, an NFT stored in the digital asset datastore 1810, the off-chain datastore 1805, the blockchain 1809, or another location on the network 1808, and the metaverse 1818.

In some embodiments, the digital story generation system 1801 includes one or more software modules programmed with computer readable electronic instructions to perform one or more operations associated with a generating a digital story. The digital story generation system 1801 operates a system for receiving, storing, editing, collaborating, mixing, displaying, modifying, publishing, and sending digital files. In some embodiments, the digital story generation system 1801 includes a collaboration system 1802 that operates a system for a collaborator or more than one collaborator to edit a digital story.

The collaboration system 1802 can provide an interface for accessing digital files, editing the files, combining files together, and publishing files. In some embodiments, the digital story generation system 1801 includes a smart contract module 1803 that operates a system for assigning metadata to digital files. In some embodiments, the digital story generation system 1801 includes a monetization module 1804 that operates a system for processing royalties based on the sale of a digital asset.

The off-chain terms datastore 1805 stores digital files related to the digital story that are not stored on the blockchain 1809. Because of the complexity or specificity, it may be preferable for some files to be stored in an off-chain terms datastore 1805. The off-chain datastore 1805 may be a database operated by an organization. In other embodiments, the off-chain terms datastore 1805 may be a decentralized data store. In some embodiments, the off-chain terms datastore 1805 may be the same or similar to the digital asset datastore 1810.

In some embodiments, the digital asset marketplace 1806 includes one or more software modules programmed with computer readable electronic instructions to perform one or more operations associated with a digital asset exchange. The digital asset marketplace 1806 operates a system for minting, previewing, and transferring digital assets. In some embodiments, the digital asset marketplace is accessible by users via the network 1808. In some embodiments, the digital asset marketplace 1806 provides a web application to interact with the digital asset marketplace. The digital asset marketplace 1806 can be a centralized marketplace or a decentralized marketplace. Examples of digital asset marketplaces include NFT marketplaces such as OpenSea, Rarible, Bitsky, Sandmilk, NBA Top Shot Marketplace, etc.

In some embodiments, the digital asset marketplace 1806 includes a digital asset engine 1807. The digital asset engine 1807 includes one or more software modules for managing the minting, buying, and selling of digital assets. In some embodiments, the digital asset engine 1807 records transactions on the blockchain 1809. In some embodiments, the digital asset engine 1807 processes information on a digital ledger to provide a platform for buying and selling digital assets. Additionally, the digital asset engine may link various digital wallets to facilitate digital asset transactions.

In some embodiments, the blockchain 1809 includes a system with a plurality of computers linked over the network 1808 which records a digital ledger. In some embodiments, the plurality of computers are linked in a peer-to-peer network. Alternative digital ledger systems can also be used. In some embodiments, the blockchain 1809 is implemented with a platform technology. For example Ethereum is a decentralized platform for a blockchain. Another example includes Solana. Any platform for a blockchain can be used which allows for the operation of a transaction protocol.

The digital asset datastore 1810 stores one or more digital assets. In some embodiments, the digital assets are digital files with an associated blockchain entry. The digital asset datastore 1810 can be a centralized or decentralized datastore system. In some embodiments, the digital asset datastore 1810 includes a backup policy which to provide additional security and resilience to the digital files associated with the digital asset.

The first collaborator 1811 is a user interested in generating a digital story. In some embodiments, the first collaborator 1811 may be an author, artist, or developer who writes a story, illustrates a story, or develops digital assets. In some embodiments, the first collaborator 1811 includes an organization interested in commissioning a digital asset. For example, the organization can be a company which provides digital files and seeks to have others create a digital story with additional content. The first collaborator 1811 can have a computer or other digital device such as a tablet or phone that stores digital files. The first collaborator 1811 can have a first collaborator wallet 1812 that stores cryptocurrency and other digital files that are on the blockchain 1809.

The second collaborator 1813 is a user interested in generating a digital story. In some embodiments, the second collaborator 1813 may be an author, artist, or developer who writes a story, illustrates a story, or develops digital assets. In some embodiments, the second collaborator 1813 includes an organization interested in commissioning a digital asset. For example, the organization can be a company that is aware of other digital files that have been uploaded to the digital story generation system 1801 and wants to create a digital story with new or modified content. The second collaborator 1813 can have a computer or other digital device such as a tablet or phone that stores digital files. The second collaborator 1813 can have a second collaborator wallet 1814 that stores cryptocurrency and other digital files that are on the blockchain 1809.

The environment 1800 shows the first collaborator 1811, first collaborator wallet 1812, second collaborator 1813, and second collaborator wallet 1814, but can have additional collaborators and additional wallets.

The digital asset seller 1815 is a user interested in selling a digital asset, which may include a digital story. In some embodiments, the first collaborator 1811 is an initial digital asset seller 1815. Digital asset buyer 1816 is a user interested in buying a digital asset. Many other users can utilize the methods and systems disclosed herein.

In some embodiments, the monetization module 1804 can be embedded into a smart contract within the smart contract module 1803. A smart contract is a program stored on or related to the blockchain that runs based on pre-determined conditions. The smart contract can be stored in other locations on the blockchain 1809 other than the smart contract module 1803.

The monetization module 1804 can use a smart contract to automate the execution of an agreement so that the collaborators can immediately (or at a determined timeline) receive a royalty or contribution units. The smart contract can also automate workflows, including triggering distribution of revenue when certain conditions are met. Conditions can include the sale of a digital story, the re-sale of a digital story, or the receipt of a pre-determined volume of revenue from a digital story. Various other conditions can exist to trigger the smart contract royalty payment. While the typical smart contract will run on the blockchain 1809, it can also be appreciated that a contract that is not on the blockchain 1809 can operate in a similar way to a smart contract on the blockchain 1809.

The digital story generation system 1801 can generate a digital story when a first collaborator 1811 uploads a digital file or digital files to the digital story generation system 1801 and a second collaborator 1813 or other collaborators upload digital files to the digital story generation system 1801 and collaborate to generate a digital story. For example, the first collaborator 1811 can upload a text to a digital story. The second collaborator 1813 can upload illustrations for the text to a digital story that the first collaborator 1811 uploaded. Other collaborators may add additional content to the digital story.

The digital story generation system 1801 can be used to combine the text and illustrations and generate a digital story. The collaborators can be created off the blockchain 1809 or created on the blockchain 1809. Digital stories that are created off the blockchain 1809 can the network 1808 to enable collaborators to contribute portions of the story to create a finished digital story and store the digital stories in an off-chain datastore 1805. Digital stores that are created on the blockchain 1809 can use blockchain technologies to collaborate on the creation of a finished digital story.

With the use of the blockchain 1809, the author can upload at least a component of a digital story to the blockchain 1809. Other collaborators can add at least another component of a digital story to the blockchain 1809. The collaborators can use the blockchain 1809 to share digital assets and create a new digital story using the components added by each collaborator.

Digital wallets, also known as crypto wallets, such as the first collaborator wallet 1812 and the second collaborator wallet 1814 can store digital files for collaborators. The digital files can be uploaded to the digital story generation system 1801 by signing the digital wallets into the digital story generation system 1801. Examples of content that a collaborator can upload include written text of a story, a character, sounds, a video, an NFT, or any other digitized asset.

The collaboration system 1802 of the digital story generation system 1801 can be used to collaborate using digital assets that were uploaded to the blockchain 1809 to create a collaborative digital story. Once complete, the collaborators can mint an NFT that relates to the digital story. Ownership of the digital story can be connected to an NFT that can be placed on the blockchain 1809. The digital files of the digital story can be stored in the digital asset datastore 1810 or an off-chain datastore 1805. A digital story can be minted to create an NFT 1817. When the NFT 1817 is transferred to another user, ownership of the NFT 1817 transfers with the transfer, which can be a sale, an air drop, or other form of transfer. There can be more than one NFT 1817 created.

The minting of the NFT 1817 can be by one of the collaborators, two or more of the collaborators, or via the collaboration system, or other combinations of those who have access to the collaborative works. More than one version of the digital story can be created using the digital story generation system 1801. Each unique version can be referenced by a different, unique NFT 1817. The unique NFTs 1817 can be related to a smart contract that awards each collaborator who contributed to the digital story with a portion of the proceeds from any sale or royalties from subsequent sales. The smart contract can be customized based on the level of contribution given by each collaborator.

By example, if the first collaborator 1811 contributed 40 percent of the content to the digital story, the second collaborator 1813 contributed 30 percent of the content, and a third contributor contributed 30 percent of the content, the royalties associated with the smart contract could be divided by percentage contributed (e.g., 40, 30, 30). The royalties could also be divided equally. The royalties could also be changed after a period of time. In this respect, the collaborators could decide to have an equal distribution until the sales or royalties equaled a set figure. Thereafter, the distribution could change to the contribution factor or another factor. The payments could be in cryptocurrency such as Bitcoin, Ethereum, or other cryptocurrency or token. The payments could also be in fiat currency.

The digital story can also be linked to a location in the metaverse 1818. As used herein, the metaverse is a virtual-reality space in which users can interact with a computer-generated environment and other users. Examples of metaverses include The Sandbox and Decentraland. The digital story can be displayed in a plot, or space, within a metaverse 1818. Users within the metaverse 1818 can collaborate to create derivatives of the digital story. The collaboration within the metaverse 1818 can be tracked via the blockchain 1809 or via other Web3 methods. As used herein, Web3 refers to the iteration of the World Wide Web that incorporates concepts such as blockchain technologies. The collaboration described herein can also be used in connection with Web2 or other Internet or mobile technologies.

Advertisements may be displayed in connection with the digital stories. Ads may be display ads that are placed in close proximity to the digital stories. Other ads may be placed within the digital stories. Advertisers may bid on priority to be placed with digital stories. Advertisers may use geographic or other demographics to place ads. The digital story application can also be linked to a third party advertising platform, such as Google AdWords.

The digital story application can have a tracker that monitors the length of a digital story and determines the appropriate number of length of ads. A short story may have one short ad at the front and no additional ads. A long story may have a beginning ad and advertisements every 7 minutes—and the middle ads can be longer or shorter depending on preferences.

The ads can change length based on user traction. For example, the system can learn whether a user will stay to watch the remainder of a digital story after 3 10 second ads are shown or if the user will leave. If users remain after 3 10 second ads, the system can add a fourth 10 second advertisement, and then a fifth, and sixth, and so on until the system understands that users are not willing to wait for that period of time. If the viewers go away when more ads are shown, the system learns that fact and reduces the number of ads that are shown. This can be adjusted as more data is tracked.

The digital story application can have a publisher review module. This will enable users to upload a digital story, enable collaboration of the digital story, create a final version of a digital story, and then upload the digital story to a user interface that can be accessed by publishers and editors. Publishers and editors can access the publisher and editor function with a subscription to locate new talent. A publisher can offer to purchase or license the content from the user via that publisher review module. A notification system can be implemented to inform a user when a publisher or editor has reviewed the digital story.

The notification system can also be used to establish communications between the user and the publisher or editor. The system can have in place royalty features that provide payment to the operator of the digital story application, the user, any collaborators, an editor, a publisher, or various other parties. The royalty system can be modified based on the scope of a particular deal.

The digital story application can have an intellectual property rights module that monitors for copyright violations. The module can include a database of content, including for example, audio, video, text, and photo files. The module can have a comparison system that is used to compare the contents of content uploaded to the system with the content that is included in the database of content to determine rights. The system can also perform external searches to determine where content that was uploaded to the system came from or whether it was previously in use. A confirmation of authentication module can be used to verify rights owners.

The digital story application can be linked to an NFT marketplace or function as an NFT marketplace. A NFT is a type of cryptographic token on a blockchain that represents a single asset. NFTs can be fully digital assets. NFTs can also be tokenized versions of real-world assets. NFTs are not interchangeable and thus serve as a proof of authenticity and ownership of digital assets. The digital stories developed via the digital story application can be made into NFTs and sold via a marketplace.

Prophetic Examples

In a first prophetic example, a digital story environment is used in learning to read and/or learning a language contexts, particularly as a teaching aid. A digital story application provided by the digital story environment accesses a digital story from a digital story database. Then the digital story application synchronizes audio file playback with text display on each page. The audio file playback includes a dialogue track, where a reader reads text displayed on a given page. A user can select a control provided by the digital story application to repeat some or all of the dialogue track. In this way, the user can learn or re-hear pronunciation of a particular word. Coordination of audio file playback and highlighting of text on the display is also provided. For instance, the digital story application highlights each word shown in text on the screen as that word is read in the corresponding dialogue track.

In a second prophetic example, a digital story environment is used to enable a first remote party to read to a different, second remote party. Possible implementations of the second prophetic example include a parent reading to a child, where the parent and child are in different locations, such as a parent on military duty stationed away from home and a parent working remotely from their family. The first party chooses a digital story, such as a children's book, from a digital story database. Then the first party uses the digital story application to record him/herself reading the story. In some instances, the first party can also initiate video recording of him/herself reading the story. The first party can also add music and sound effects in addition to any music or sound effects that are already part of the digital story. Next, the first party shares the modified digital story with the second party, using email, social media, a subscription service, or the like. Then the second party, or a guardian of the second party, accesses the modified digital story and plays the reading for the second party. As the second party views playback of the digital story, the second party can opt to view a video of the first party reading the story. The video can be displayed in a corner portion of the interface showing the digital story.

In a third prophetic example, a digital story environment is used in an educational environment, particularly related to school environments. In the third prophetic example, a teacher would like to teach Shakespeare's Taming of the Shrew. The teacher assigns character roles to various students in the class using the digital story application. Each student accesses a digital story created for the class using a digital story application. Then each student reads and records performance of their part using the digital story application. Some students choose to incorporate music and/or sound effects to their performance. Each student's contribution is compiled into the digital story, which can then be shared via social media, email, etc., and viewed remotely, such as in the classroom. In some instances, third parties, such as an English class in a different state, can view, review, and rate each classes' performance, sometimes as part of a competition or fundraiser.

In a fourth prophetic example, a digital story environment is used to create an NFT that is displayed in the metaverse. In this example, a first collaborator would upload digital assets in the form of a children's book text from a digital wallet to a digital story generation system, or digital story application. A second collaborator would upload other digital assets in the form of illustrations from a digital wallet to the digital story generation system. One or both of the collaborators can use the collaboration system within the digital story generation system to create a digital story that included the text from the first collaborator and the illustrations from the second collaborator. One or more of the collaborators can create a smart contract via the smart contract module and create a royalty structure through the monetization module. One or more of the collaborators can then mint the NFT via a digital asset marketplace. The NFT token will be stored on the blockchain and the digital art associated with the NFT will be stored in a digital asset datastore. The NFT can be associated with a metaverse where people in the metaverse can view the digital story. A digital asset buyer can purchase the digital story by purchasing the NFT associated with the story.

What is claimed is:

1. A digital story editing system, comprising:
at least one processor; and
memory encoding computer executable instructions that, when executed by the at least one processor, cause the digital story editing system to:
receive a digital story;
display an author control module programmed to control collaboration of the digital story, wherein the author control module includes a displayed text module programmed to control collaboration associated with text of the digital story, wherein the displayed text module is configured for more than one collaborator to edit the text of the digital story using artificial intelligence, wherein the more than one collaborator includes a viewer who is accessing the digital story, wherein the artificial intelligence is trained to identify terms in the text of the digital story as call-out content;
select the call-out content to display one or more actions associated with the terms;
activate the displayed one or more actions, the one or more actions including:
a geo-enable action that modifies the call-out content based upon a geographic location of the viewer; and
a modify-enable action that allows the call-out content to be modified based on a stored user preference associated with the viewer; and
produce a collaborated digital story with input by the more than one collaborator.

2. The digital story editing system of claim 1, wherein the author control module includes:
a submissions toggle programmed to select whether the digital story will be available for collaboration;
a character module programmed to select whether characters in the digital story are available for collaboration;
a character preview module programmed to preview text associated with a character in the digital story; and
an experience level module programmed to select a level of experience required for a collaborator to collaborate on the digital story.

3. The digital story editing system of claim 1, wherein the author control module includes an audio module, wherein the audio module is programmed to:
select a collaborator to contribute audio to the digital story; and
restrict certain sounds, music, and audio files.

4. The digital story editing system of claim 1, wherein the author control module includes an illustration module, wherein the illustration module is programmed to:
configure collaboration associated with illustration or graphics in the digital story;
illustrate at least a portion of the digital story; and
select restrictions related to illustrations provided by a collaborator.

5. The digital story editing system of claim 1, wherein the author control module includes a notification module configured to provide the more than one collaborator a notification regarding a status of a collaborator's content.

6. The digital story editing system of claim 1, wherein revisions by the more than one collaborator of the digital story are tracked to verify which collaborator made each revision.

7. The digital story editing system of claim 6, wherein the digital story editing system is configured to calculate royalties among all or a portion of the the more than one collaborator to the digital story based on a level of collaboration provided to the digital story.

8. The digital story editing system of claim 1, wherein the memory encoding computer executable instructions that, when executed by the at least one processor, cause the digital story editing system to provide a submissions review module, wherein the submissions review module is configured to: control collaboration of the digital story; and provide collaborator detail that shows at least one of: experience of collaborator, collaborator rank, and collaborator submissions count.

9. The digital story editing system of claim 1, wherein the memory encoding computer executable instructions that, when executed by the at least one processor, cause the digital story editing system to provide a live read module, wherein the live read module is configured to permit a live reading of the digital story by more than one user.

10. The digital story editing system of claim 1, wherein the collaborated digital story is made into a non-fungible token.

* * * * *

UNITED STATES PATENT AND TRADEMARK OFFICE
CERTIFICATE OF CORRECTION

PATENT NO. : 12,436,665 B2
APPLICATION NO. : 17/817392
DATED : October 7, 2025
INVENTOR(S) : Howell et al.

Page 1 of 1

It is certified that error appears in the above-identified patent and that said Letters Patent is hereby corrected as shown below:

In the Claims

Column 40, Line 25, Claim 7: delete "the the" and insert --the--

Signed and Sealed this
Ninth Day of December, 2025

John A. Squires
*Director of the United States Patent and Trademark Office*